United States Patent
Kneuper et al.

(10) Patent No.: US 10,540,902 B2
(45) Date of Patent: *Jan. 21, 2020

(54) FLIGHT PLANNING AND COMMUNICATION

(71) Applicant: Textron Innovations Inc., Providence, RI (US)

(72) Inventors: Jeremy Joseph Kneuper, Hesston, KS (US); John Robert Lanier, Wichita, KS (US); Jason Michael Decker, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 265 days.

This patent is subject to a terminal disclaimer.

(21) Appl. No.: 15/494,782

(22) Filed: Apr. 24, 2017

(65) Prior Publication Data

US 2017/0229026 A1   Aug. 10, 2017

Related U.S. Application Data

(60) Division of application No. 14/643,464, filed on Mar. 10, 2015, which is a continuation-in-part of
(Continued)

(51) Int. Cl.
*G08G 5/00* (2006.01)
*G01C 23/00* (2006.01)
(Continued)

(52) U.S. Cl.
CPC ........ *G08G 5/0047* (2013.01); *B64D 43/02* (2013.01); *B64D 47/08* (2013.01); *G01C 23/00* (2013.01);
(Continued)

(58) Field of Classification Search
CPC .... G01C 23/00; G08G 5/0021; G08G 5/0034; G08G 5/0052; G08G 5/0065; G08G 5/0091; G08G 5/025; G09B 29/003
See application file for complete search history.

(56) References Cited

U.S. PATENT DOCUMENTS 5,208,590 A   5/1993  Pitts
5,272,652 A   12/1993 Rosenshein et al.
(Continued)

FOREIGN PATENT DOCUMENTS

EP           2623935 A1    7/2013
WO    WO-2011128835 A2 *  10/2011  ........... G08G 5/0013

OTHER PUBLICATIONS

G. Hines, Z. Rahman, D. Jobson, G. Woodell and S. Harrah, "Real-time Enhanced Vision System," SPIE Defense and Security Symposium 2005, Orlando, FL, Apr. 2005.
(Continued)

*Primary Examiner* — Charles J Han
(74) *Attorney, Agent, or Firm* — Erise IP, P.A.

(57) ABSTRACT

The invention described herein provides a flight crew with an easier, more intuitive, system and method to create a flight plan. A flight planning system is presented for navigation of an aircraft utilizing a touch screen display device mounted in an aircraft cockpit spanning the width and height of the instrument panel. The system provides navigational views, an interactive map, charts, a radio frequency component, a weather component, and a virtual flight plan. A flight planning method is presented that uses an interactive map on a touch screen device in an aircraft cockpit. The method accepts user inputs and displays a desired flight plan on the map. A method for providing a chart on a touch screen device is presented that includes presenting a list of menu options on a touch screen mounted in an aircraft cockpit. The (Continued)

method provides the flight crew with heads-up operation, providing greater situational awareness.

16 Claims, 14 Drawing Sheets

Related U.S. Application Data application No. 14/642,256, filed on Mar. 9, 2015, now Pat. No. 9,772,712.

(60) Provisional application No. 61/951,157, filed on Mar. 11, 2014, provisional application No. 61/951,166, filed on Mar. 11, 2014, provisional application No. 61/951,168, filed on Mar. 11, 2014, provisional application No. 61/951,189, filed on Mar. 11, 2014, provisional application No. 61/951,195, filed on Mar. 11, 2014, provisional application No. 61/951,201, filed on Mar. 11, 2014, provisional application No. 61/951,208, filed on Mar. 11, 2014, provisional application No. 61/951,215, filed on Mar. 11, 2014, provisional application No. 61/951,216, filed on Mar. 11, 2014, provisional application No. 61/951,220, filed on Mar. 11, 2014, provisional application No. 61/951,223, filed on Mar. 11, 2014, provisional application No. 61/951,231, filed on Mar. 11, 2014, provisional application No. 61/951,234, filed on Mar. 11, 2014, provisional application No. 61/951,240, filed on Mar. 11, 2014, provisional application No. 61/951,243, filed on Mar. 11, 2014, provisional application No. 61/951,253, filed on Mar. 11, 2014, provisional application No. 61/951,260, filed on Mar. 11, 2014, provisional application No. 61/951,145, filed on Mar. 11, 2014, provisional application No. 61/951,152, filed on Mar. 11, 2014.

(51) Int. Cl.
| | | |
|---|---|---|
| *G08G 5/02* | (2006.01) | |
| *G09B 29/00* | (2006.01) | |
| *G06F 3/0354* | (2013.01) | |
| *B64D 43/02* | (2006.01) | |
| *B64D 47/08* | (2006.01) | |
| *G06F 3/041* | (2006.01) | |
| *G06F 3/0481* | (2013.01) | |
| *G06F 3/0484* | (2013.01) | |
| *G06F 3/0488* | (2013.01) | |
| *G06F 3/0482* | (2013.01) | |
| *G06F 3/0485* | (2013.01) | |
| *G06T 11/20* | (2006.01) | |

(52) U.S. Cl.
CPC .......... *G06F 3/03547* (2013.01); *G06F 3/041* (2013.01); *G06F 3/0482* (2013.01); *G06F 3/0484* (2013.01); *G06F 3/0485* (2013.01); *G06F 3/04817* (2013.01); *G06F 3/04883* (2013.01); *G06T 11/206* (2013.01); *G08G 5/0021* (2013.01); *G08G 5/0034* (2013.01); *G08G 5/0039* (2013.01); *G08G 5/0052* (2013.01); *G08G 5/0065* (2013.01); *G08G 5/0091* (2013.01); *G08G 5/025* (2013.01); *G09B 29/003* (2013.01); *G06F 2203/04806* (2013.01); *G06T 2200/24* (2013.01)

(56) References Cited

U.S. PATENT DOCUMENTS

| | | |
|---|---|---|
| 6,687,578 B2 | 2/2004 | Lehman et al. |
| 7,808,377 B2 | 10/2010 | Shafaat et al. |
| 8,032,267 B1 | 10/2011 | Simon |
| 8,195,347 B2 | 6/2012 | Boorman |
| 8,264,376 B1 | 9/2012 | McLoughlin et al. |
| 8,380,366 B1 | 2/2013 | Schulte et al. |
| 8,515,658 B1 * | 8/2013 | Foster .................. G01C 23/005 340/945 |
| 8,554,457 B2 | 10/2013 | White et al. |
| 8,570,192 B2 | 10/2013 | McLoughlin et al. |
| 8,626,360 B2 | 1/2014 | Komer et al. |
| 8,634,972 B2 | 1/2014 | Mathews, Jr. et al. |
| 8,666,649 B2 | 3/2014 | Otto et al. |
| 9,302,780 B2 | 4/2016 | Zaneboni et al. |
| 2001/0035832 A1 | 11/2001 | Block |
| 2003/0156046 A1 | 8/2003 | Dwyer |
| 2004/0140959 A1 | 7/2004 | Matsumura et al. |
| 2004/0236481 A1 | 11/2004 | Sain-Aroman et al. |
| 2004/0239529 A1 * | 12/2004 | Tran ....................... G01C 23/00 340/961 |
| 2005/0007261 A1 * | 1/2005 | Berson .................. G01C 23/00 340/945 |
| 2007/0258642 A1 * | 11/2007 | Thota ...................... G06F 16/29 382/173 |
| 2008/0125960 A1 * | 5/2008 | Wipplinger .......... G01C 23/005 701/455 |
| 2008/0140269 A1 | 6/2008 | Naimer et al. |
| 2009/0112380 A1 | 4/2009 | Nutaro et al. |
| 2009/0115637 A1 | 5/2009 | Naimer et al. |
| 2009/0238378 A1 | 9/2009 | Kikinis et al. |
| 2010/0070110 A1 | 3/2010 | Badli et al. |
| 2010/0141482 A1 | 6/2010 | Wyatt et al. |
| 2010/0194602 A1 | 8/2010 | Engels et al. |
| 2010/0198433 A1 | 8/2010 | Fortier et al. |
| 2010/0211237 A1 | 8/2010 | Nichols et al. |
| 2010/0231418 A1 | 9/2010 | Whitlow et al. |
| 2010/0250030 A1 | 9/2010 | Nichols et al. |
| 2010/0256863 A1 | 10/2010 | Nielsen et al. |
| 2010/0262318 A1 | 10/2010 | Ariens |
| 2010/0305786 A1 | 12/2010 | Boorman |
| 2011/0193694 A1 | 4/2011 | Bowden et al. |
| 2011/0241901 A1 | 10/2011 | Firra |
| 2011/0282631 A1 | 11/2011 | Poling et al. |
| 2011/0303741 A1 | 12/2011 | Bolton et al. |
| 2012/0026190 A1 | 2/2012 | He et al. |
| 2012/0035849 A1 | 2/2012 | Clark et al. |
| 2012/0265372 A1 | 10/2012 | Hedrick |
| 2012/0316776 A1 | 12/2012 | Brown |
| 2013/0027226 A1 | 1/2013 | Cabos |
| 2013/0076540 A1 | 3/2013 | McLoughlin et al. |
| 2013/0088435 A1 | 4/2013 | Sai |
| 2013/0162632 A1 | 6/2013 | Varga et al. |
| 2013/0191182 A1 | 7/2013 | Foo et al. |
| 2013/0245860 A1 | 9/2013 | Cooper |
| 2013/0249948 A1 | 9/2013 | Reitan |
| 2014/0032097 A1 | 1/2014 | Kolbe et al. |
| 2014/0032105 A1 | 1/2014 | Kolbe et al. |
| 2014/0172204 A1 | 6/2014 | Coulmeau et al. |
| 2014/0285661 A1 | 9/2014 | Feyereisen et al. |
| 2014/0347197 A1 | 11/2014 | Boomgarden et al. |
| 2015/0081197 A1 * | 3/2015 | Gaertner ............. G08G 5/0021 701/120 |
| 2015/0210388 A1 | 7/2015 | Criado et al. |
| 2015/0217856 A1 | 8/2015 | Messguen et al. |
| 2015/0262545 A1 | 9/2015 | Kneuper et al. |
| 2015/0352952 A1 | 12/2015 | Kneuper et al. |

OTHER PUBLICATIONS

Mangion, D., et al, "A Single Interactive Display Concept for Commercial and Business Jet Cockpits," 11th AIAA Aviation Technology, Integration and Operations (AIIO) Conference, Virginia Beach, VA, Sep. 2011.

(56) References Cited

OTHER PUBLICATIONS

U.S. Appl. No. 14/643,510, Office Action dated Feb. 18, 2016, 24 pages.
International Search Report and Written Opinion issued in PCT/US2015/019437, dated Jun. 18, 2015, 14, pages.

* cited by examiner

FLIGHT PLANNING AND COMMUNICATION

RELATED APPLICATION

This application is a divisional application of U.S. patent application Ser. No. 14/643,464, filed Mar. 10, 2015, which is a continuation-in-part of U.S. patent application Ser. No. 14/642,256, filed Mar. 9, 2015, which claims the benefit of U.S. Provisional Application No. 61/951,145, filed Mar. 11, 2014; U.S. Provisional Application No. 61/951,189, filed Mar. 11, 2014; U.S. Provisional Application No. 61/951,260, filed Mar. 11, 2014; U.S. Provisional Application No. 61/951,231, filed Mar. 11, 2014; U.S. Provisional Application No. 61/951,240, filed Mar. 11, 2014; U.S. Provisional Application No. 61/951,243, filed Mar. 11, 2014; U.S. Provisional Application No. 61/951,157, filed Mar. 11, 2014; U.S. Provisional Application No. 61/951,168, Mar. 11, 2014; U.S. Provisional Application No. 61/951,201, filed Mar. 11, 2014; U.S. Provisional Application No. 61/951,152, filed Mar. 11, 2014; U.S. Provisional Application No. 61/951,195, filed Mar. 11, 2014; U.S. Provisional Application No. 61/951,208, filed Mar. 11, 2014; U.S. Provisional Application No. 61/951,220, filed Mar. 11, 2014; U.S. Provisional Application No. 61/951,234, filed Mar. 11, 2014; U.S. Provisional Application No. 61/951,166, filed Mar. 11, 2014; U.S. Provisional Application No. 61/951,215, filed Mar. 11, 2014; U.S. Provisional Application No. 61/951,253, filed Mar. 11, 2014; U.S. Provisional Application No. 61/951,216, filed Mar. 11, 2014; and U.S. Provisional Application No. 61/951,223, filed Mar. 11, 2014. The disclosures of which are incorporated herein by reference.

BACKGROUND

The invention relates generally to the field of aircraft. More specifically, the invention relates to the field of instrument panels for aircraft.

Current methods for creating and modifying flight plans require typing and heads-down time, which reduce a pilot's situational awareness. Historically, paper charts used for flight planning were contained in binders. With the advent of an electronic flight bag, pilots viewed charts on electronic displays. More recently, avionics manufacturers have provided methods for displaying charts electronically on the main flight display of the aircraft's instrument panel, but these methods are cumbersome and inefficient.

SUMMARY

In one embodiment, a flight planning system for navigation of an aircraft is provided. The system includes a storage component having one or more instructions stored thereon, a touch screen display device, a processor coupled to the display device and a memory. The processor is configured to execute the one or more instructions stored in the storage component. The system further includes a manager configured to provide navigational views via the touch screen display device in an aircraft cockpit. The manager includes a mapping interface for displaying one or more maps on the touch screen display device, a charts component for displaying one or more aeronautical charts on the touch screen display device, a radio frequency component for receiving and displaying one or more radio frequencies on the touch screen display device, a weather component for displaying one or more weather representations, wherein the one or more weather representations overlays the one or more maps on the touch screen display device, and a virtual flight plan component for displaying one or more simulated flight plans on the touch screen display device.

In another embodiment, a method for flight planning utilizing an interactive map on a touch screen device in an aircraft cockpit is provided. The method includes receiving a set of flight rules, receiving an indication of both an origin airport and a destination airport via the touch screen device, and based on each of the set of flight rules and the origin and destination airports, displaying a flight path on the map.

In yet another embodiment, a method for providing a chart on a touch screen device is provided. The method includes presenting a list of menu options on a touch screen mounted in an aircraft cockpit, said list including a charts function. The method further includes receiving a selection of the charts function, in the charts function receiving an indication of an airport, upon identifying the airport, enabling selection of (i) an approach or departure, (ii) a navigation method, (iii) a runway, and based on the selections, identifying corresponding charts and automatically displaying the corresponding charts on the touch screen device.

BRIEF DESCRIPTION OF THE DRAWING FIGURES

DETAILED DESCRIPTION

Figure 1:
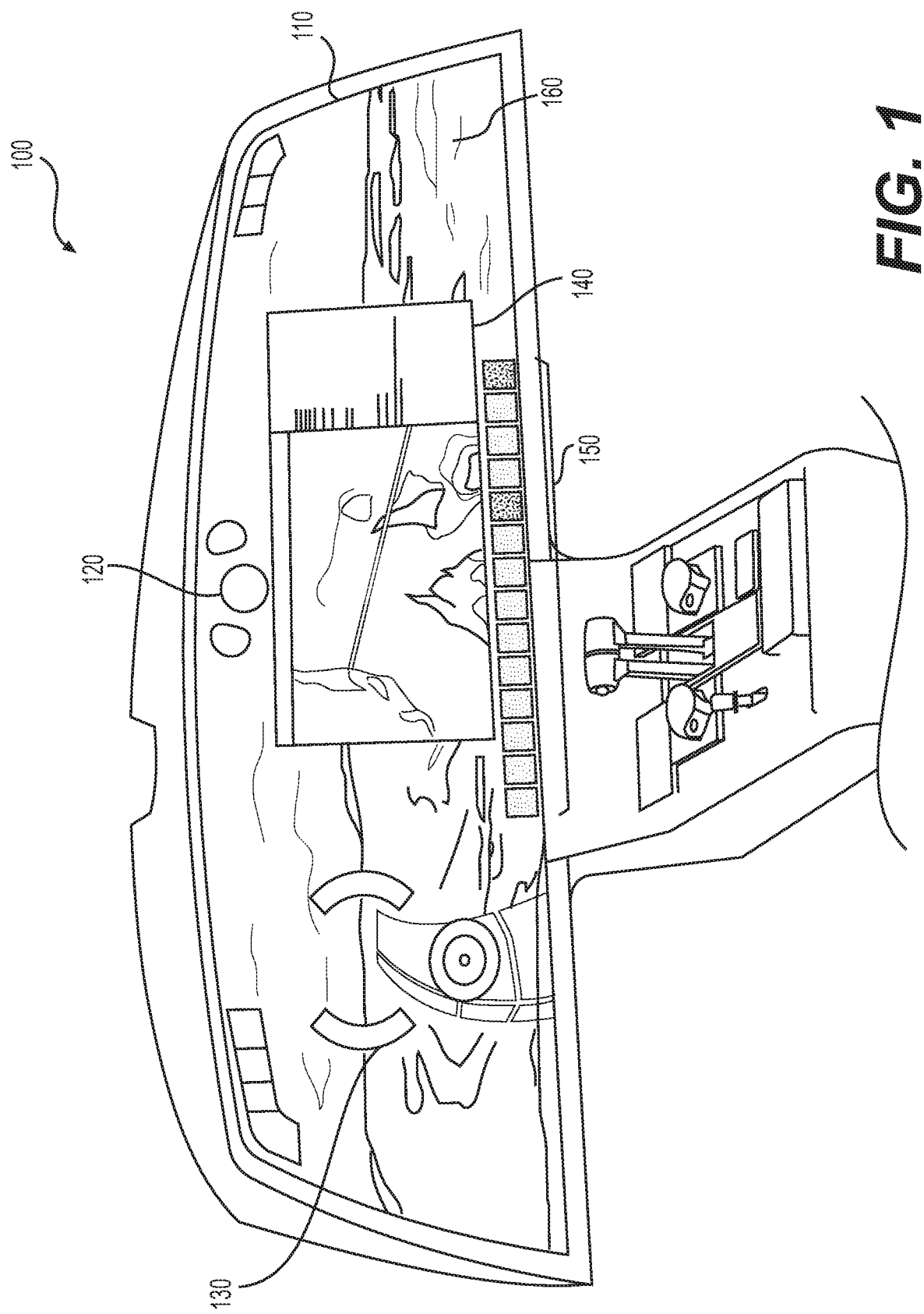
FIG. 1 depicts a perspective view of an embodiment of a touch-screen instrument panel system for an aircraft.

Referring to FIG. 1, a representation 100 of a touch-screen instrument panel (TSIP) is illustrated. The TSIP replaces the plurality of instruments, dials, gauges, and screens typically utilized on the console of an aircraft. The TSIP is configured for at least a touch screen implementation. In some embodiments, the TSIP may span the width of a cockpit of an aircraft. As illustrated in FIG. 1, the TSIP is the width of the cockpit and may be accessed by both a pilot, co-pilot, and the like.

The TSIP is a digital information panel and may include a plurality of digital layers. The digital layers may overlay one another to create multiple views. For instance, and as will be described in further detail below, one layer may be a real-time view while another layer may be a three-dimensional representation of, for example, weather while another layer may include flight instruments and may not be obstructed with any other layers or representations. A processor, similar to that onboard computer 201 of FIG. 2, for example, may stack the plurality of digital images to provide a complete real-time image including the real-time view and any other additional information stacked on top of it as deemed appropriate by the user. Additional information may include synthetic vision, three-dimensional weather, information regarding traffic or airports, etc. Furthermore, the TSIP may be configured such that, in the event of a failure or malfunction of the TSIP, each digital layer becomes transparent so that the standby flight instruments are accessible/viewable to users.

Turning back to FIG. 1, the representation 100 includes the TSIP 110, one or more flight instrument displays 120, one or more navigational displays 130, one or more user interface panels 140, a menu 150, and the real-time view 160. Initially, the real-time view displayed by the TSIP may be captured by a high-definition (HD) camera on the exterior of the aircraft. In an embodiment, the HD camera is mounted to the nose of the aircraft. The camera may be mounted in any appropriate position to capture a real-time view that gives a display of a view ahead of an aircraft. Additionally, as will be further discussed herein, the real-time view may be altered or enhanced by, for instance, synthetic vision enhancements.

The TSIP 110 further includes one or more flight instrument displays 120. The flight instrument display 120 may be configured to include any necessary information regarding the current configuration of the aircraft. Additionally, the flight instrument display 120 may be identically reproduced such that a plurality of users have easy access to the one or more flight instrument displays 120. By way of example, the flight instrument display 120 illustrated in FIG. 1 may be identically reproduced and positioned on the opposite side of the TSIP 110.

The TSIP 110 further includes one or more navigational displays 130.

Similar to the one or more flight instrument displays 120, the one or more navigational displays 130 may be positioned anywhere within the TSIP 110. Additionally, the one or more navigational displays 130 may be reproduced for ease of access for multiple users. Given the size of the TSIP 110, the reproduction may be convenient when there is more than one user requiring access to the one or more navigational displays 130.

The TSIP 110 may include one or more user interface panels 140. The one or more user interface panels 140 may be displayed alone or in combination with other panels. The panels 140 display information and accept input from a user regarding various aircraft systems. Exemplary panels provide information regarding, but not limited to, anti-icing systems, environmental control systems, electrical systems, flight controls, hydraulic systems, cabin pressurization systems, interior and exterior lighting, propulsion systems, cabin window shades, weather maps, charts, maps, alerts, system information notifications, maintenance notifications, flight plans, traffic alerts, etc. Depending on the information displayed, the user interface panels may be presented automatically (e.g., without user input) or upon receipt of a user input.

The TSIP 110 may further include a menu 150. The menu may include one or more selectors to aid a user in navigating the TSIP 110. For example, the menu 150 may include a weather indicator that provides a weather informational pop-up. The menu 150 may also include a charts indicator to access various charts. Any feature that may be accessed via the TSIP may be represented in the menu 150. Various features will be described herein and in several of the applications related by subject matter, referenced above, and herein incorporated by reference in their entirety.

Additionally, the TSIP 110 may include a real-time view 160. The real-time view 160 may be an ahead-type view illustrating the view ahead of an aircraft. The real-time view 160 may be captured, as previously mentioned, by a camera mounted to the aircraft. The real-time view 160 may be a real-time panoramic view. Panoramic, as used herein, refers to a wide-angle view. In additional embodiments, infrared imaging may be used in the real-time view to aid in navigation at night, for instance.

Figure 2:
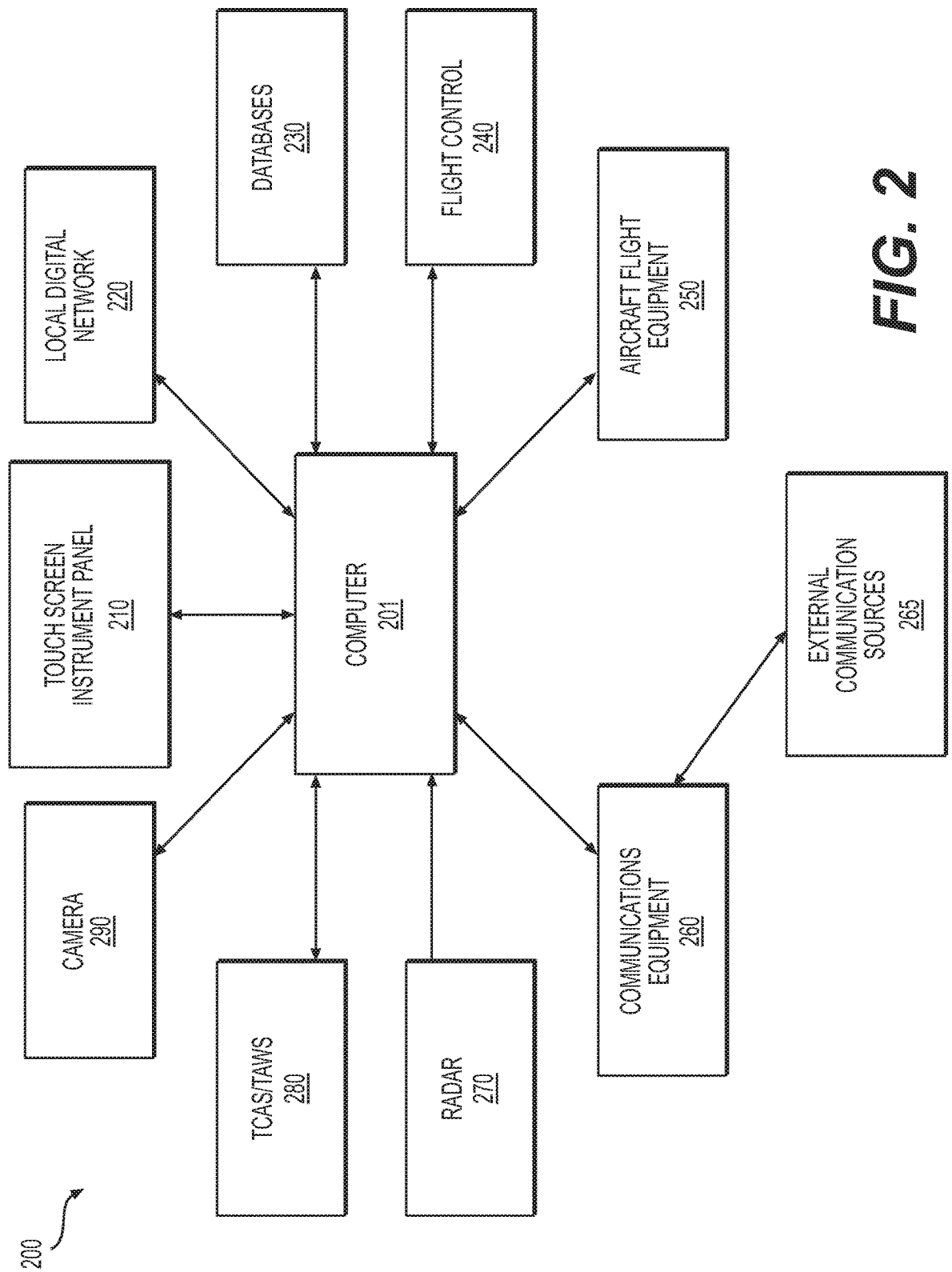
FIG. 2 depicts a system diagram for an embodiment of a touch-screen instrument panel system for an aircraft.

FIG. 2 shows one embodiment of a system environment 200 including an aircraft touch-screen instrument panel 210. System environment 200 has a network of subsystems that includes an on-board computer 201, the touch-screen instrument panel (TSIP) 210, a local digital network 220, databases 230, a flight controller 240, aircraft flight equipment 250, communications equipment 260, radar 270, an anti-collision and terrain awareness 280, and a camera 290. Communications equipment 260 communicates with external communication sources 265, which are not physically located onboard the aircraft (for example, terrestrial communications, satellites, and other aircraft). TSIP 210 interacts with the subsystems of system environment 200 through computer 201.

On-board computer 201 includes for example non-volatile memory, software, and a processor. TSIP 210 serves as a user interface for computer 201. Memory stores software that includes machine readable instructions, that when executed by processors provide control and functionality of system environment 200 as described herein. Computer 201 has for example electronic circuitry including relays and switches to electrically connect with components of system environment 200. In an embodiment, computer 201 includes a first computer and a second computer located on-board the aircraft, where the second computer minors the first computer, thereby providing redundancy in the event of a computer failure. It should be recognized that where a single computing device (e.g., computer 201) is represented graphically, the component might be represented by multiple computing units in a networked system or have some other equivalent arrangement which will be evident to one skilled in the art.

TSIP 210 provides a user interface for visualizing and controlling subsystems of system environment 200 through computer 201. TSIP 210 includes a substrate that supports a display and a touch membrane. Substrate is a transparent material such as glass, acrylic, polycarbonate or other approved for flight materials on which display and touch membrane are overlaid. In an embodiment, substrate is made of flexible material for conforming to aircraft cockpit dimensions, including complex shapes such as curves or corners.

In an embodiment, the substrate has a large aspect ratio for providing panoramic images. Display is for example an organic light-emitting diode (OLED) display, which is thin and flexible for layering onto substrate. When unpowered, the display is, in some embodiments, transparent. Touch membrane is a thin, transparent and flexible material that is layered onto a display and capable of sensing touch. Touch membrane is for example a resistive, capacitive, optical, or infrared touch screen. Together, touch membrane and display provide TSIP 210 with a visual display that a user may control by touching with one or more fingers or a stylus. Such a touch comprises a touch input to the TSIP 210. In some embodiments, TSIP 210 is a multi-touch display that allows multiple users to touch and interact with the TSIP 210 simultaneously. For example, in some embodiments, both a pilot and a co-pilot may simultaneously touch and interact with TSIP 210 through different windows or controls displayed on TSIP 210.

Local digital network 220 provides a digital connection between computer 201 and on-board subsystems, such as cabin management subsystem (CMS) and in-flight entertainment (IFE). CMS includes for example cabin lighting, heating, air conditioning, water temperature, and movement of shades. IFE includes for example audio and video content. TSIP 210 provides an interface for monitoring and controlling CMS and IFE over local digital network 220.

Databases 230 are digital databases stored in memory of computer 201 on-board the aircraft. Databases 230 include charts, manuals, historical aircraft component data, and checklists Databases 230 allow pilots to quickly access and search information via computer 201. TSIP 210 displays the information such that pilots maintain a heads-up view while piloting an aircraft. Historical aircraft component data is for example updated during flight with data from aircraft flight equipment 250 (e.g., sensors) via computer 201.

Flight controller 240 provides navigation, avionics, and autopilot functions. In an embodiment, flight controller 240 is a standalone unit supplied by an independent manufacturer (e.g., Garmin, Honeywell, Rockwell Collins). TSIP 210 displays aircraft information from flight controller 240 via computer 201 such as airspeed, altitude, heading, yaw, and attitude (i.e., pitch and bank).

Aircraft flight equipment 250 includes flight control surfaces, engines, anti-icing equipment, lights, and sensors (e.g., temperature, pressure, electrical). Aircraft flight equipment 250 is monitored and controlled by pilots using TSIP 210 through computer 201 for flying the aircraft.

Communications equipment 260 allows pilots to communicate with one another, with passengers, and with airports and other aircraft. Communications equipment 260 includes radios, phones, and internal and external digital networks (e.g., Internet and Intranet). Different frequency bands are used for example to transmit and receive data with multiple recipients. TSIP 210 allows pilots to communicate with others by using communications equipment 260 via computer 201.

Communications equipment 260 includes a transceiver configured to communicate with external communication sources 265, which include for example terrestrial based communication towers, satellites, and other aircraft. External communication sources 265 also provide communications with for example radio, global positioning system (GPS), and Internet. TSIP 210 provides a user interface for communicating with external communication sources 265, enabling a pilot or co-pilot to communicate with air traffic control, terrestrial communication towers (e.g., navigation towers, waypoints), satellites, and directly with other aircraft for example. TSIP 210 allows pilots to receive and transmit external communications through communications equipment 260 and computer 201.

Satellites provide network links for phone and internet communications, and GPS information. Aircraft interact with satellites using communications equipment 260 to transmit and receive radio frequency signals. TSIP 210 allows pilots to communicate via satellites through computer 201 and communications equipment 260.

Other aircraft within view of camera 290 are displayed in real-time on a panoramic view provided by TSIP 210. Information about other aircraft, which may be retrieved from radar 270 or radio communication, is displayed for improved pilot awareness and ease of contact.

Radar 270 includes equipment for determining a location and speed of objects from radio waves. Equipment for radar 270 includes a radio transmitter for producing pulses of radio waves and an antenna for receiving a reflected portion of the radio waves from nearby objects. TSIP 210 receives information from radar 270 via computer 201 and uses the information to display the location of nearby objects, such as weather, terrain and other aircraft.

Anti-collision and terrain awareness 280 includes a traffic collision avoidance subsystem (TCAS) and a terrain awareness and warning subsystem (TAWS). Anti-collision and terrain awareness 280 includes radar 270 and transponder information to determine aircraft position relative to other aircraft and Earth terrain, and to provide appropriate warning signals. TSIP 210 displays these warnings and allows pilots to respond to them by, for example, silencing an audible warning signal.

Camera 290 provides forward looking images to TSIP 210 through computer 201. Camera 290 is mounted for example under the aircraft nose. In alternative embodiments, camera 290 is located on the tail or on aircraft wings. Camera 290, in embodiments, receives one or both of visible as well as infrared (IR) light. Further, in embodiments, camera 290 provides high-definition (HD) quality images (e.g., using an HD capable camera). In a preferred embodiment, camera 290 provides HD quality and IR functionality. Alternatively, camera 290 might include two separate cameras, one for HD quality and a second camera for IR imaging.

Camera 290 provides images to computer 201, which renders the images for real-time projection on TSIP 210. TSIP 210 projects HD panoramic views looking forward and below from the front of the aircraft. The forward view spans an angle of about 120.degree. to about 180.degree. for example. In an embodiment, TSIP 210 uses IR imaging to project a synthetic view, which is for example useful at night or when flying through clouds or fog that obscure visible light.

Various components of the user interface displayed on TSIP 210 are designed to provide a synoptic view of the state or condition of the aircraft, meaning that the user interface components provide an intuitive, broad view of the aircraft, its various components and subsystems, and their configuration, condition, and status. The user interface utilizes the touch screen functionality of the TSIP 210 to present views of the aircraft to intuitively communicate information and accept input from the pilot. In some embodiments, the views also include graphical depictions of all or a relevant portion of the aircraft. In some embodiments, the views of the aircraft also incorporate display elements, including without limitation graphical, textual, and numerical elements, in conjunction and associated with graphical depictions of the aircraft to convey the state of the aircraft and to simultaneously convey multiple pieces of information to the pilot or user. The graphical, textual, and numerical elements of the user interface may flash, change color, change content, appear, disappear, move or change location, or otherwise change in response to user input or the state of the aircraft systems. The varying colors, values, or appearances of the display element symbolize or represent the state of the aircraft and its various systems. Some of the display elements may function as input elements such as buttons or text or number entry fields, receiving input from a user through TSIP 210.

The computer 201 monitors the aircraft's data buses to determine the positions, temperatures, pressures, and states of various equipment and systems of the aircraft. TSIP 210 graphically displays the data gleaned from the buses and stored in computer 201 in the appropriate synoptic panels or windows for flight crew interaction. The inventive user interface provides a thorough, easily understood, intuitive and user-friendly interaction with each synoptic user interface. The touch screen functionality of TSIP 210 also allows the user to activate aircraft systems and change configuration settings through user interface displayed on TSIP 210.

The user interface provides for a variety of user interface elements grouped into a variety of "windows", which may also be referred to as "panels" or "pages". Some user interface elements are common to a plurality of the synoptic user interface panels. For example, each user interface panel may comprise a border surrounding the information displayed in the user interface and defining a "panel". A title for each user interface may be displayed within the panel or on the border of the panel area. In some embodiments, the title is displayed in the top or the bottom left or right corner of the panel. The title may optionally be displayed as an abbreviation. Similar to other known graphical user interfaces, each "window" or "panel" may be provided with controls for closing or minimizing the panel to remove it from active display on the TSIP 210. Various embodiments of the panels that are presented in TSIP 210 are described in relation to FIGS. 3 through 7 and FIGS. 9 through 13.

In some embodiments of the user interface, a silhouette, cross-section, or other diagram of an aircraft is utilized to illustrate the state of the aircraft and convey relevant information to the pilot. The diagram of an aircraft may be a top, bottom, side, front, back, or perspective view of an aircraft. The windows may incorporate both static elements and active controls. Static elements comprise elements that are fixed or are updated automatically by the system to display the current aircraft configuration and status. Active controls may be updated automatically by the system to display the current aircraft configuration and status, but are also capable of interacting with the user via TSIP 210 to receive pilot input.

FIGS. 3-7 depict exemplary panels of a flight planning system for navigation of an aircraft. The flight planning system is displayed on TSIP 210, which uses on-board computer 201 for storing and executing instructions. Algorithms written with software calculate flight planning information, such as flight duration for example, using computer 201.

On-board computer 201 includes a manager for providing navigational views on TSIP 210. The navigational views on TSIP 210 include a mapping interface for displaying one or more maps (see FIGS. 3-7), a charts component for displaying one or more aeronautical charts (see FIGS. 9-12), a radio frequency component for receiving and displaying one or more radio frequencies (see FIG. 13), a weather component for displaying one or more weather representations overlaid on the map (see FIGS. 3-7), and a virtual flight plan component for displaying one or more simulated flight plans.

Figure 3:
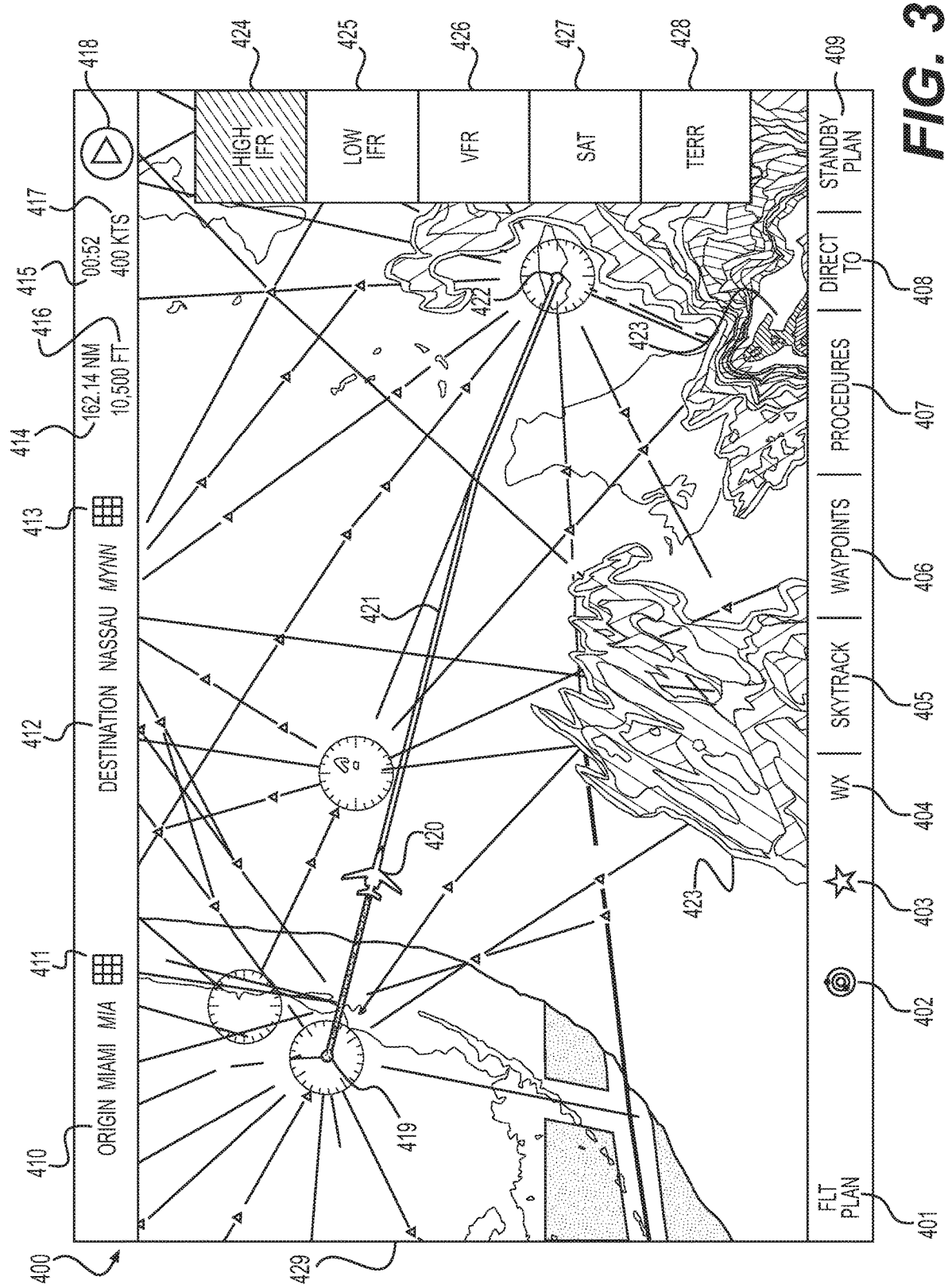
FIG. 3 depicts one embodiment of a flight planning system for navigation of an aircraft based on high instrument flight rules.

FIG. 3 depicts an exemplary panel 400 of the flight planning system. Panel 400 is configured to show a mapping interface 429 based on high instrument flight rules (IFR). Mapping interface 429 includes a displayed image of a map, which may be manipulated by a user with touch gestures, such as zooming and dragging, to view maps of various areas of Earth. Panel 400 includes menus listed, for example, along the bottom, top and sides of the panel. The menus may include icons, names or abbreviations that may be activated by touch, thus serving as links or shortcuts to various features of the flight planning system. The menu along the bottom of panel 400 includes, for example, a title indicator 401, a proximity icon 402, a favorites icon 403, a weather link (WX) 404, a skytrack link 405, a waypoints link 406, a procedures link 407, a direct-to link 408, and a standby-plan link 409. Panel 400 may be configured to display greater or fewer menu items along the bottom or to arrange items differently without departing from the scope hereof.

Proximity icon 402 may be configured such that selection thereof activates a proximity component of the flight planning system for organizing information based on distances from the aircraft. For example, activating the proximity component by selecting proximity icon 402 displays a list of nearby airports and their corresponding radio frequencies on TSIP 210, wherein the list is organized by proximity to the aircraft. Information is updated real-time during aircraft flight, thereby re-organizing the list as needed to continually provide information for the nearest airports. Proximity icon 402 provides a convenient one-touch link to display information for flight planning based on proximity. Proximity may be defined as any distance relative to the aircraft within a predetermined maximum distance.

Favorites icon 403 is configured such that selection thereof activates a favorites component of the flight planning system for organizing information based on a custom list of favorite items. For example, activating the favorites component by selecting favorites icon 403 displays a list of frequently used or favorite items on TSIP 210, wherein the list may be tailored to individual pilot preference. The list of favorite items may include flight paths and airports with their corresponding radio frequencies, for example. Favorites icon 403 provides a convenient one-touch link to display information for flight planning based on a custom list.

Weather link (WX) 404 is configured such that selection thereof activates or deactivates a weather component of the flight planning system for displaying real-time and forecasted weather representations overlaid on mapping interface 429. For example, real-time weather is determined from radar 270 and forecasted weather is determined from external communication sources 265, such as the National Weather Service, and depicted on mapping interface 429. Weather may be represented by shaded regions, contour lines or other illustrations, with different shades or colors illustrating rain, snow and heaviness of precipitation, for example. Weather representation 423 is depicted along the bottom and in the bottom right corner of mapping interface 429 of FIGS. 3-7. Weather link (WX) 404 provides a convenient one-touch link to display information for flight planning based on real-time and forecasted weather.

Skytrack link 405 may be configured such that selection thereof activates or deactivates a path projecting navigational aid component of the flight planning system, which may be used to assist flight planning by providing navigational parameters including but not limited to aircraft speed, heading and altitude. The navigational aid is displayed in the primary flight instrument area of TSIP 210. Skytrack link 405 provides a convenient one-touch link to display information on TSIP 210 for flight planning based on navigational parameters.

Waypoints link 406 may be configured such that selection thereof activates a waypoints component of the flight planning system for establishing waypoint coordinates and displaying them on mapping interface 429. A waypoint is a coordinate in physical space, for example, latitude, longitude and altitude. In an embodiment, waypoints are determined by touching or selecting a location on mapping interface 429. In an alternative embodiment, waypoints are searched from a list stored in database 230. In another embodiment, waypoints are selected from a list of waypoint names, which is organized, for example, by proximity, favorites, or alphabetically. Waypoints link 406 provides a convenient one-touch link to establish and display waypoints for flight planning.

Procedures link 407 may be configured such that selection thereof activates a procedures component of the flight planning system. Procedures component includes a series of menus containing procedures displayed on TSIP 210 for example. Procedures component includes, for example, established protocols, step-by-step instructions, and checklists for flight planning. In an embodiment, the series of menus include cascaded panels, with a separate menu displayed in each panel. Menu selections may determine which procedures or subsequent menus to display. Procedures link 407 provides a convenient link to display information for flight planning based on established procedures.

Figure 6:
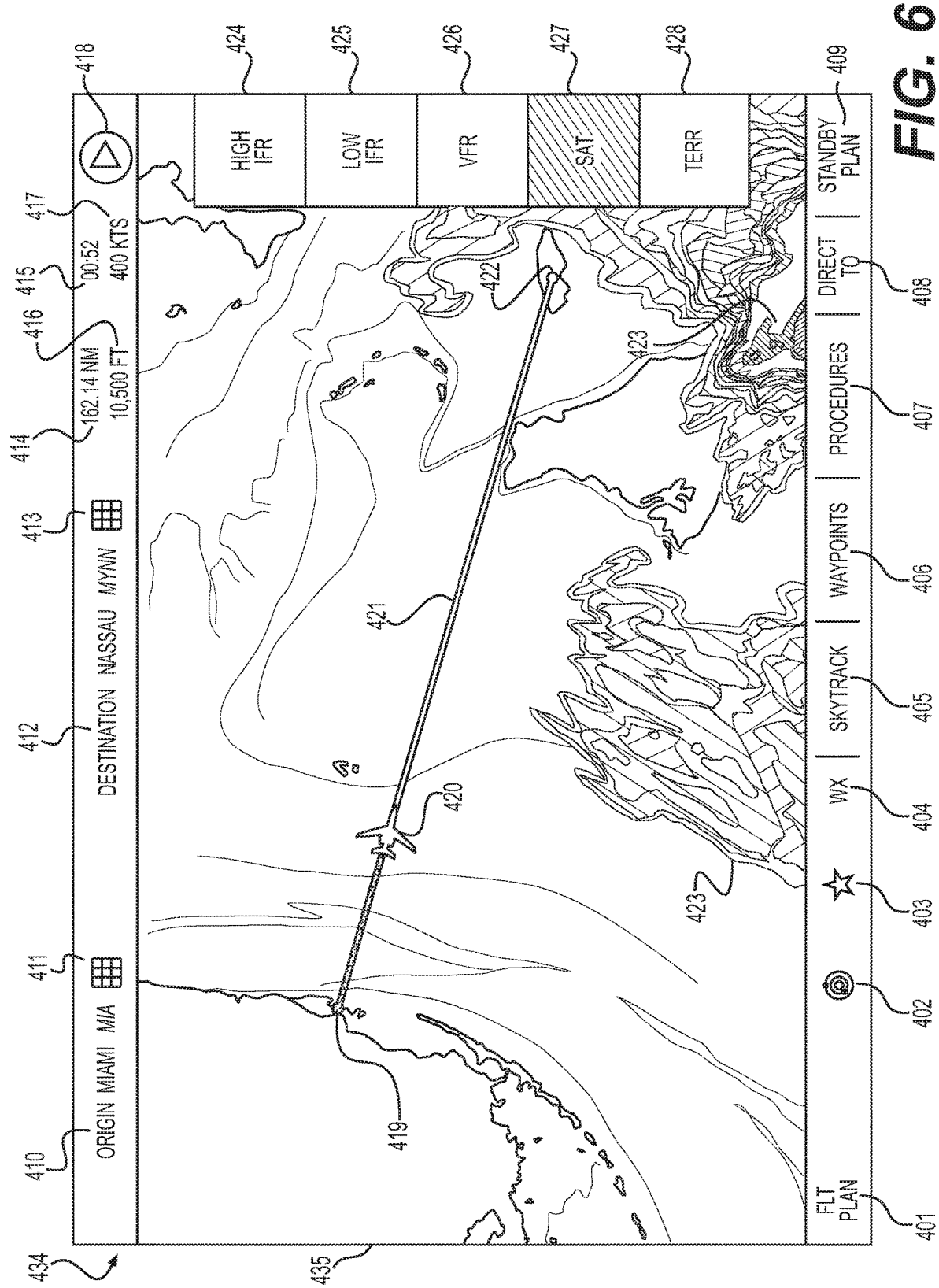
FIG. 6 depicts one embodiment of a flight planning system for navigation of an aircraft based on satellite imagery.
Figure 7:
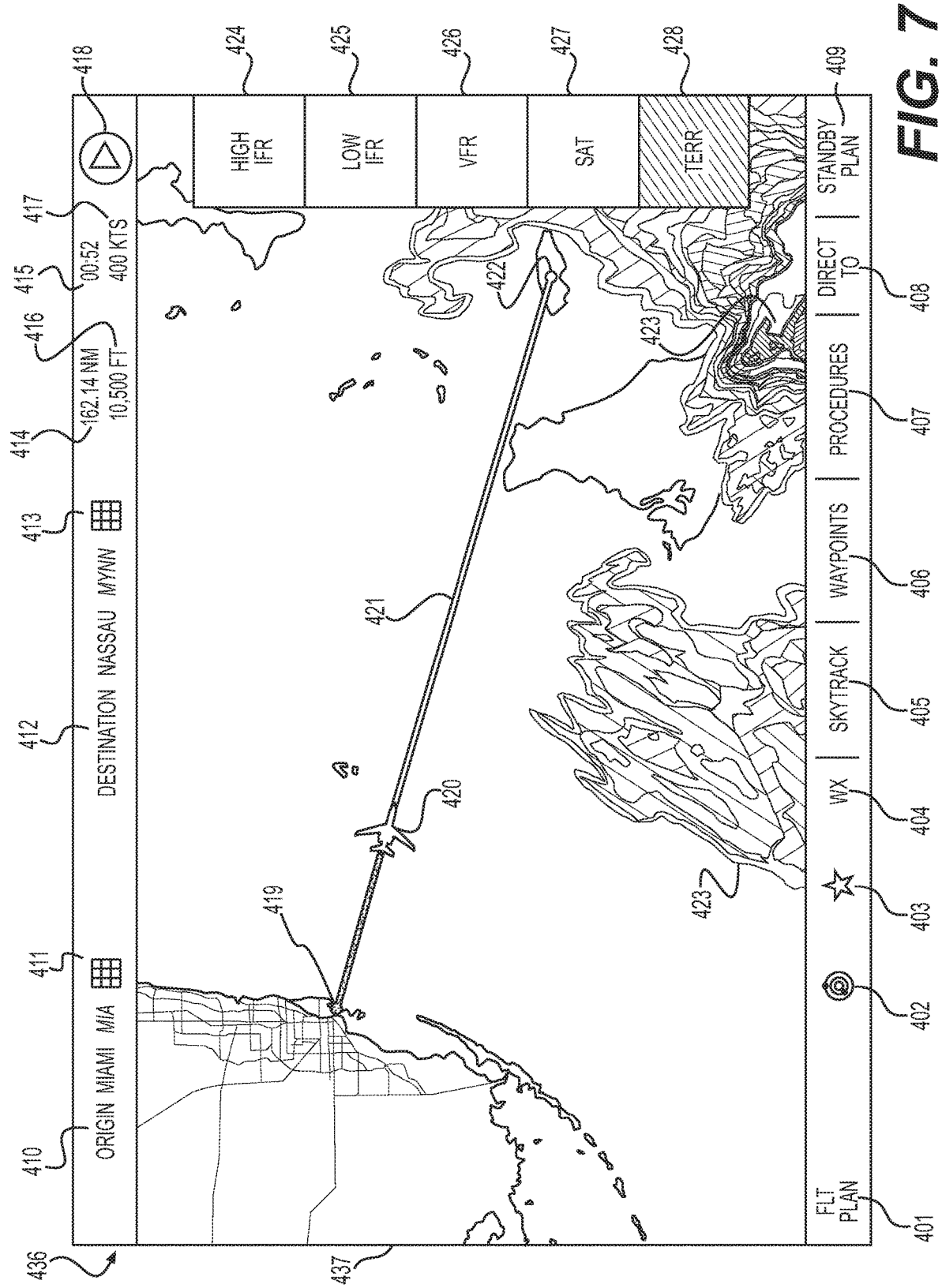
FIG. 7 depicts one embodiment of a flight planning system for navigation of an aircraft based on a terrain representation.

Direct-to link 408 may be configured such that selection thereof activates a direct-to component of the flight planning system. The direct-to component establishes a flight path 421 directly from an origin to a destination without intervening waypoints. Note that FIGS. 6 and 7 illustrate a flight path 421 headed directly from an origin to a destination, whereas flight paths 421 of FIGS. 3-5 include a turn. Direct-to link 408 provides a convenient one-touch link to establish a direct flight path 421 for efficient flight planning.

Standby-plan link 409 may be configured such that selection thereof activates a standby-plan component of the flight planning system. The standby-plan component enables a user to establish a back-up flight plan that is on standby and ready to be used if a sudden change is necessary to an original flight plan. Standby-plan link 409 provides a convenient link for establishing a back-up flight plan.

The menu along the top of panel 400 in FIG. 3 includes, for example, an origin name indicator 410, an origin chart icon 411, a destination name indicator 412, a destination chart icon 413, a distance indicator 414, a duration indicator 415, an altitude indicator 416, an airspeed indicator 417, and a play button 418. Panel 400 may be configured to display greater or fewer menu items along the top or to arrange items differently without departing from the scope hereof.

Origin name indicator 410 may be configured such that selection thereof activates an origin selecting component of the flight planning system. Similarly, destination name indicator 412 may be configured such that selection thereof activates a destination selecting component of the system. Origin name indicator 410 and destination name indicator 412 are, for example, used to select an airport and display its name for originating and terminating a flight path 421, respectively. Origin name indicator 410 and destination name indicator 412 display airport names and codes along the top of panel 400, as in FIG. 3 for example. In an embodiment, selecting either origin name indicator 410 or destination name indicator 412 displays a touch-screen keyboard on TSIP 210 for entering an airport from a searchable database, such as database 230. In an embodiment, airports selected using origin name indicator 410 and destination name indicator 412 are also highlighted on mapping interface 429. For example, flight path 421 begins at an origin location 419 and ends at a destination location 422. Origin name indicator 410 and destination name indicator 412 provide convenient selection of airports for efficient flight planning.

Within mapping interface 429, origin location 419 may be configured such that selection thereof activates the origin selecting component of the flight planning system. Similarly, destination location 422 may be configured such that selection thereof activates the destination component of the flight planning system. Origin location 419 and destination location 422 are, for example, used to select airports for originating and terminating a flight path 421 by touching locations within mapping interface 429. By touching and holding a location, a user may activate the system to display a menu on TSIP 210 for selecting an airport and runway, and designating the location as origin, waypoint, or destination, for example. In areas where multiple airports are available, the displayed menu may provide airport options. In an embodiment, selection of origin location 419 and destination location 422 from mapping interface 429 may also populate origin name indicator 410 and destination name indicator 412, respectively, with corresponding airport names and codes. Origin location 419 and destination location 422 provide convenient selection of airports from mapping interface 429 for efficient flight planning.

Origin chart icon 411 and destination chart icon 413 may be configured such that selection thereof activates a charts component of the flight planning system. Selection of origin chart icon 411 displays one or more charts corresponding to an origin airport. Similarly, selection of destination chart icon 413 displays one or more charts corresponding to a destination airport. For example, selecting origin chart icon 411 displays one or more charts corresponding to origin name indicator 410, and selecting destination chart icon 413 displays one or more charts corresponding to destination name indicator 412. Origin chart icon 411 and destination chart icon 413 provide convenient selection of appropriate airport charts for displaying on TSIP 210. Example charts are shown in FIGS. 9-12.

Distance indicator 414 displays an estimated flight distance as part of the flight planning system. Similarly, duration indicator 415 displays an estimated duration as part of the flight planning system. Distance may be calculated based on a projected flight path, and duration may be calculated based on distance and a desired altitude and airspeed. Based on flight path 421 displayed in mapping interface 429, distance indicator 414 may display a value, for example, in nautical miles (NM) and duration indicator 415 may display a value, for example, in hours and minutes (hh:mm). Distance indicator 414 is 162.14 nautical miles and duration indicator 415 is 52 minutes, as shown in FIG. 3. As alternate flight paths are considered, distance indicator 414 may display corresponding alternate distances and duration indicator 415 may display corresponding alternate times. During flight, as the distance and duration remaining to arrive at the destination decrease, the distance indicator 414 and duration indicator 415 update accordingly. For flight planning activities, distance indicator 414 and duration indicator 415 conveniently display the remaining estimated flight path distance and duration, respectively.

Altitude indicator 416 is configured such that selection thereof activates an altitude component of the flight planning system. Similarly, airspeed indicator 417 is configured such that selection thereof activates an airspeed component of the flight planning system. Altitude indicator 416 and airspeed indicator 417 may be used, for example, to select a cruising altitude and a cruising airspeed, respectively. In an embodiment, touching altitude indicator 416 or airspeed indicator 417 on TSIP 210 displays a touch-screen keyboard for entering values. Altitude indicator 416 and airspeed indicator 417 display the selected cruising altitude and airspeed, respectively. Altitude indicator 416 is 10,500 feet (FT) and airspeed indicator 417 is 400 nautical miles per hour (KTS) in FIG. 3. In an embodiment, altitude indicator 416 and airspeed indicator 417 display values using different units, such as metric system units. During flight, altitude indicator 416 and airspeed indicator 417 may update in real-time to display the aircraft's actual airspeed and altitude. Since an aircraft's altitude and airspeed affect duration of a flight, duration indicator 415 updates its value whenever changes are made to altitude indicator 416 or airspeed indicator 417 during flight planning activities. Altitude indicator 416 and airspeed indicator 417 provide convenient selection of cruising altitude and cruising airspeed for efficient flight planning.

Play button 418 is configured such that selection thereof activates a virtual flight plan component of the flight planning system. By touching play button 418, a virtual flight plan is displayed on mapping interface 429. Specifically, aircraft icon 420 moves from origin location 419 along flight path 421 to destination location 422. The virtual flight plan dynamically represents the aircraft simulating a projected path of the flight plan overlaid on mapping interface 429. In an embodiment, the virtual flight plan simulates the flight at an accelerated pace and displays the estimated remaining distance and duration via distance indicator 414 and duration indicator 415, which count down during the simulation. Virtual flight plan also illustrates a forecasted weather representation 423 overlaid on mapping interface 429, thereby enabling a pilot to visualize aircraft icon 420 dynamically encounter forecasted weather representation 423. Thus, alternate flight paths may be considered in an attempt to avoid forecasted weather 423. Selection of play button 418 causes a display of a visual simulation of a virtual flight plan for effective flight planning.

The menu along the right side of the panel in FIG. 3 includes options to select alternate views for mapping interface 429 including views based on high instrument flight rules (IFR) 424, low IFR 425, visual flight rules (VFR) 426, satellite imagery (SAT) 427, and terrain representation (TERR) 428 for example. Panel 400 may be configured to display greater or fewer menu items along the right of the panel or to arrange items differently without departing from the scope hereof.

FIG. 3 depicts an exemplary mapping interface 429 based on high IFR 424. Note that high IFR 424 is highlighted compared to the other options on the right side of the panel, indicating that the high IRF option was selected. IFR are rules and regulations established by the Federal Aviation Administration (FAA) to govern flight when flying conditions do not allow for safe visual reference, and pilots must rely on their flight instruments for navigation. High IFR 424 illustrates available routes on an aeronautical map based on an established set of rules for efficient flight planning.

FIGS. 4-7 depict exemplary flight planning panels 430, 432, 434, 436, which are examples of panel 400 of FIG. 3. Flight planning panels 430, 432, 434, 436 include mapping interfaces 431, 433, 435, 437, which are based on low IFR 425, VFR 426, satellite imagery 427, and terrain representation 428, respectively. A user has the option of viewing one or more mapping interfaces (429, 431, 433, 435, 437) while creating the flight plan.

Figure 4:
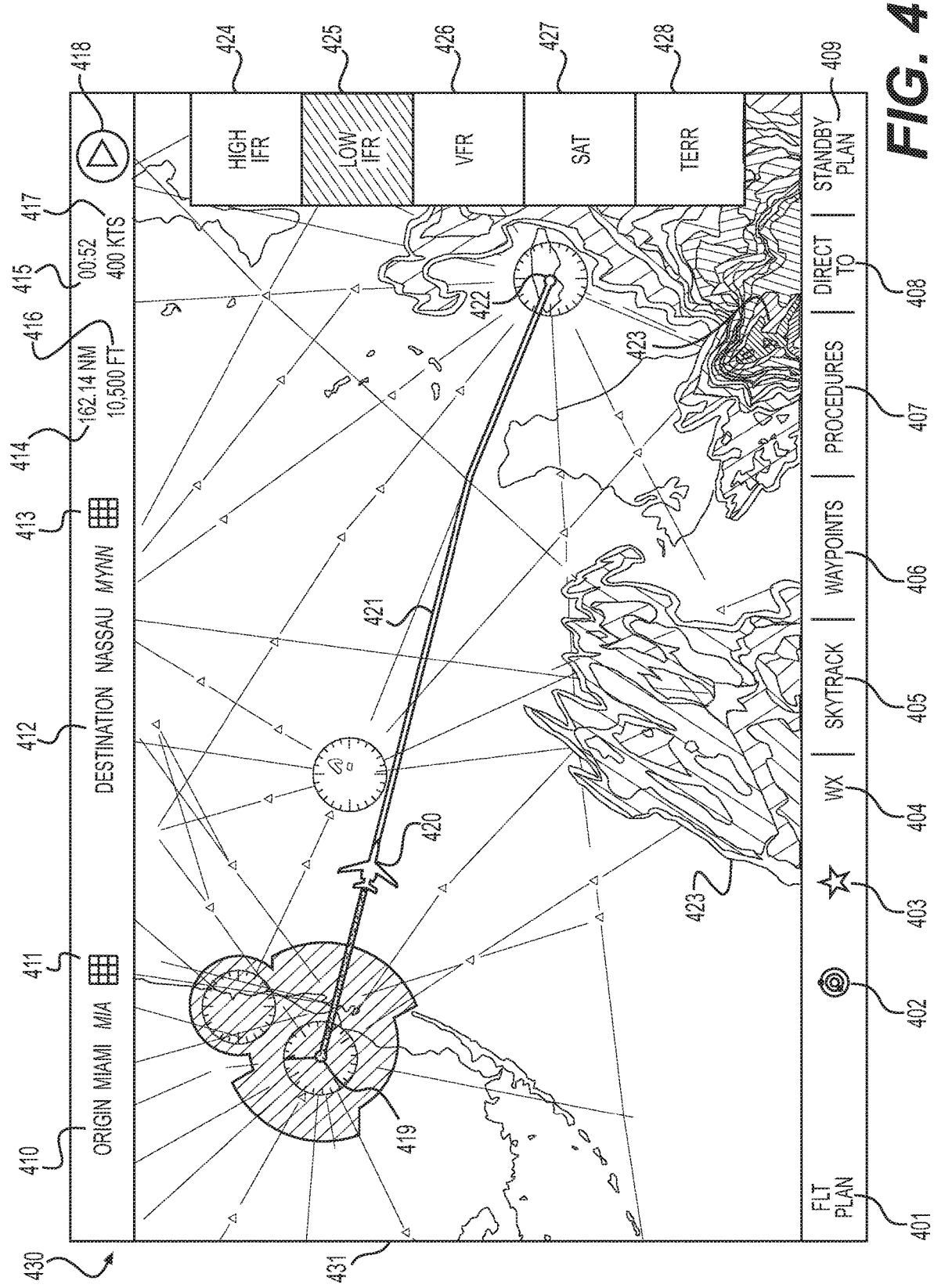
FIG. 4 depicts one embodiment of a flight planning system for navigation of an aircraft based on low instrument flight rules.

FIG. 4 depicts flight planning panel 430, which is an example of flight planning panel 400 of FIG. 3, that is configured to show a mapping interface 431 based on low IFR 425. Note that the set of routes available differ between high IFR 424 and low IFR 425. Low IFR 425 illustrates available routes on an aeronautical map based on an established set of FAA rules for efficient flight planning.

Figure 5:
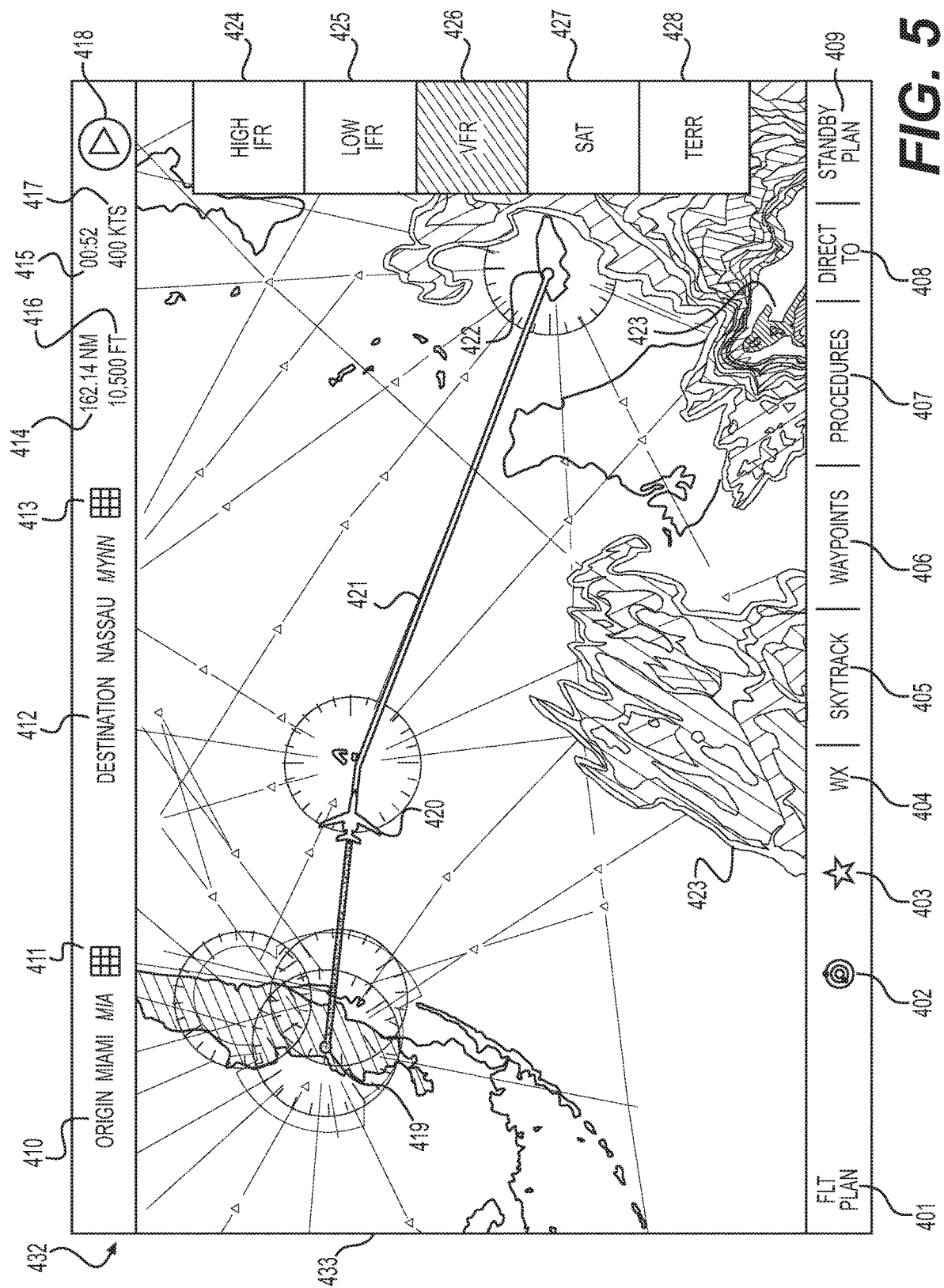
FIG. 5 depicts one embodiment of a flight planning system for navigation of an aircraft based on visual flight rules (VFR).

FIG. 5 depicts flight planning panel 432, which is an example of flight planning panel 400 of FIG. 3, that is configured to show a mapping interface 433 based on VFR 426. VFR is a set of FAA rules and regulations for flying an aircraft using outside visual cues, wherein reliance on instruments is optional for pilots. VFR 426 illustrates an aeronautical map showing routes based on available visual cues for efficient flight planning.

FIG. 6 depicts flight planning panel 434, which is an example of flight planning panel 400 of FIG. 3, that is configured to show a mapping interface 435 based on satellite imagery (SAT) 427. Satellite imagery includes, for example, composite images of multiple photographs taken by one or more satellites from an Earth orbit. Satellite imagery 427 provides a mapping interface 435 based on composite satellite images for efficient flight planning.

FIG. 7 depicts flight planning panel 434, which is an example of the flight planning panel 400 of FIG. 3, that is configured to show a mapping interface 437 based on a terrain representation (TERR) 428. Terrain representation 428 represents terrain features of Earth with lines and shading, where different shades may represent water, land and different elevations for example. Lines may indicate city and county boundaries, roads, and land/water interfaces. Terrain representation 428 provides a mapping interface 437 based on Earth terrain for efficient flight planning.

Figure 8:
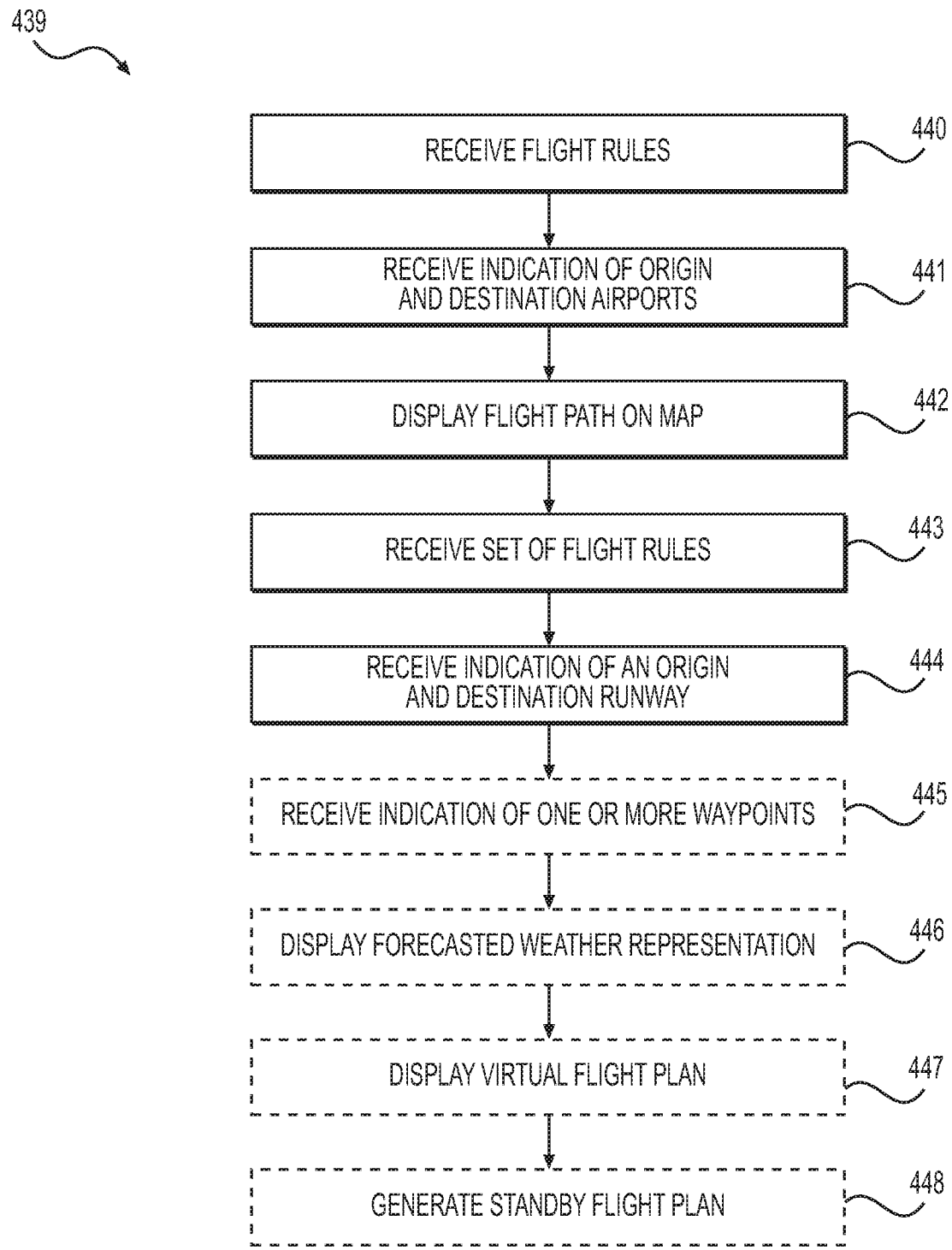
FIG. 8 shows steps of one embodiment of a flight planning method utilizing an interactive map on a touch screen device in an aircraft cockpit.

FIG. 8 shows steps of an exemplary flight planning method 439 utilizing an interactive map on a touch screen device in an aircraft cockpit. In step 440, a set of flight rules is received. In an example of step 440, a user selects either high IFR 424, low IFR 425, or VFR 426, as shown in FIG. 3-5, respectively, for viewing and selecting a flight path based on a desired set of flight rules.

In step 441, an indication of both an origin airport and a destination airport is received via the touch screen device. In an example of step 441, a user selects an origin/destination airport by activating the origin/destination selecting component of the flight planning system from panel 400. Specifically, origin selecting component is activated using origin name indicator 410, to search for or enter an airport name or code via keyboard, or using origin location 419, to select an origin airport by touching and holding a location within mapping interface 429. Similarly, destination selecting component is activated using destination name indicator 412 to type an airport name or code, or touching and holding destination location 422.

In step 442, a flight path is displayed on the map based on each of the set of flight rules and the origin and destination airports. In an example of step 442, flight path 421 is depicted on the map of at least one of mapping interface 429 (FIG. 3), 431 (FIG. 4), 433 (FIG. 5), 435 (FIG. 6), 437 (FIG. 7). In an embodiment, flight path 421 illustrates a projected path from origin location 419 to destination location 422 that is displayed on a particular mapping interface for a given set of flight rules (e.g., 429 of FIG. 3, 431 of FIG. 4, 433 of FIG.

5), as well as for the alternate views satellite imagery 435 (FIG. 6) and terrain representation 437 (FIG. 7).

In step 443, a set of flight rules is received from a selection of at least one of the following options: high IFR, low IFR, or VFR. In an example of step 443, a user displays and selects one set of flight rules using panel 400 by touching high IFR 424, low IFR 425, or VFR 426.

In step 444, an indication of an origin runway and a destination runway is received. In an example of step 444, a user selects origin and destination runways by activating the origin/destination selecting component of the flight planning system. Specifically, origin selecting component is activated using origin name indicator 410 or origin location 419, and destination selecting component is activated using destination name indicator 412 or destination location 422, as described above for step 441. Once an origin/destination airport is selected, a menu of available runways for receiving a runway selection is displayed at step 444.

In optional step 445, an indication of one or more waypoints between the origin and destination based on received map locations is received, wherein a waypoint is a coordinate in physical space. In an example of step 445, a waypoint is selected by touching and holding a location on mapping interface 429 to display a menu for selecting a waypoint. In an embodiment, one or more additional waypoints are added to the flight plan by sequentially touching and holding map locations.

In optional step 446, forecasted weather is displayed utilizing dynamic representations on the map. In an example of step 446, forecasted weather representation 423 is displayed on mapping interface 429 of FIG. 3. In an embodiment, weather representation 423 is a dynamic representation of recent weather or forecasted weather.

In optional step 447, a virtual flight plan is displayed, wherein an aircraft icon simulates the flight path on the map. In an example of step 447, touching play button 418 initiates aircraft icon 420 to move from origin location 419 to destination location 422 along flight path 421 of FIGS. 3-7. In an embodiment, simulated flight plan includes potential interaction with dynamic representation of forecasted weather 423.

In optional step 448, an alternate flight path is generated, thereby providing a standby flight plan. In an example of step 448, the alternate flight path is created using steps 440 to 447, as described above. In an embodiment, the alternate flight path is designated as a standby flight plan by touching standby plan link 409.

FIGS. 9-12 depict example charts from a charts component of the flight planning system. The charts component may be activated in several ways, including touching origin chart icon 411 or destination chart icon 413 of FIG. 3, for example. One or more chart icons may also be displayed on TSIP 210 outside of flight planning panel 400. Proximity icon 402 and favorites icon 403 may also be used to activate the charts component. Within the mapping interface 429, charts component is activated in response to touch of an origin location 419 or destination location 422 on TSIP 210. Lastly, charts component is activated by typing an airport code, airport name, or city from a keyboard.

The charts component may utilize onboard computer 201 to process information including user input, database 230, GPS location, and flight plan, for determining which airport chart to display. Database 230 provides the necessary charts to display. GPS location data are accessed when the proximity component is used to select an airport. Flight plan data are used based upon origin and destination airports of a loaded flight plan.

Figure 9:
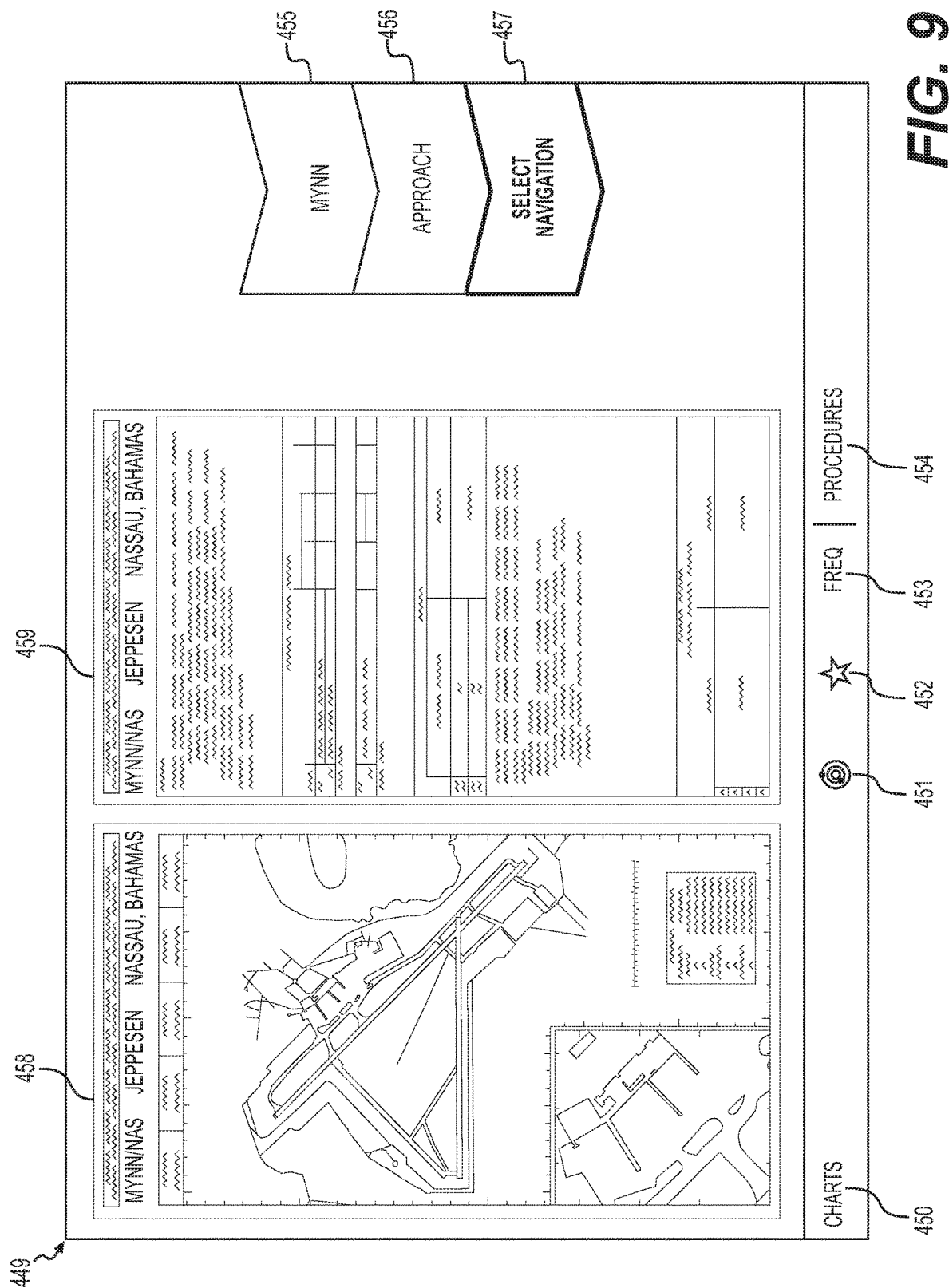
FIG. 9 depicts one embodiment of a charts panel of a flight planning system for navigation of an aircraft.

FIG. 9 depicts an exemplary charts panel 449. Along the bottom of charts panel 449 is, for example, a title indicator 450, proximity icon 451, favorites icon 452, frequencies (FREQ) link 453, and procedures link 454. Proximity icon 451 and favorites icon 452, which are examples of proximity icon 402 and favorites icon 403 of FIG. 3, are used to access charts based on proximate airports or a list of favorite/frequent airports, respectively. Frequencies link 453 provides one touch access to a list of radio frequencies associated with the displayed chart. The radio frequencies displayed include, for example, Automatic Terminal Information Service (ATIS), Clearance, Ground Control, Tower, Approach Control and Departure Control. The user may select a desired frequency by touch and load the desired frequency into a radio frequency panel (see FIG. 13). Procedures link 454, which is an example of procedures link 407 of FIG. 3, provides a link to standardized procedures and checklists for airport approach and departure. Charts panel 449 may be configured to display greater or fewer items along the bottom or to arrange items differently without departing from the scope hereof.

The right side of charts panel 449 includes airport code indicator 455, approach/departure indicator 456, and select navigation indicator 457. Selection of airport code indicator 455 enables selection of an airport and displays its code. Approach/departure indicator 456 enables selection for approaching or departing an airport. For example, if a user is approaching Nassau, Bahamas, MYNN is selected for airport code indicator 455 and approach is selected for approach/departure indicator 456. A chart for approaching MYNN is displayed in charts panel 449 as a first page chart 458 and a second page chart 459. First page chart 458 shows airport runways and gates, for example. By pinning charts panel 449 to TSIP 210, such that panel 449 remains stationary on TSIP 210, first and second chart pages 458, 459 may be zoomed, dragged, or otherwise manipulated using touch gestures. Selection of select navigation indicator 457 enables selection of a navigation type (see FIG. 10).

Figure 10:
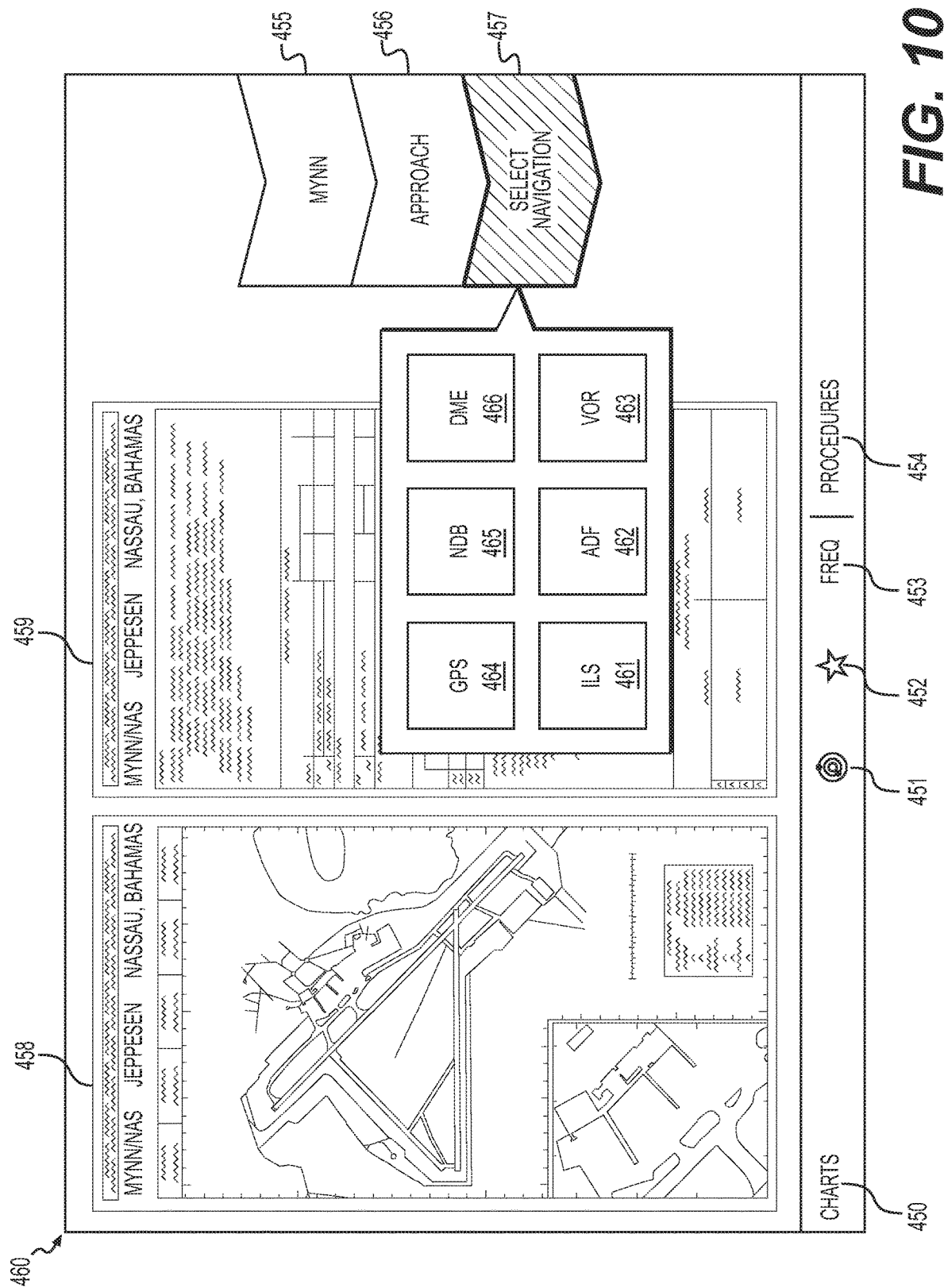
FIG. 10 depicts one embodiment of a charts panel of a flight planning system for navigation of an aircraft in which available navigation types are displayed.

FIG. 10 depicts an exemplary charts panel 460 in which select navigation indicator 457 is selected to display navigation types available for the aircraft and selected airport. Navigation types include instrument landing system (ILS) 461, automatic direction finder (ADF) 462, VHF (very high frequency) omnidirectional range (VOR) 463, global positioning system (GPS) 464, non-directional beacon (NDB) 465, and distance measuring equipment (DME) 466.

Figure 11:
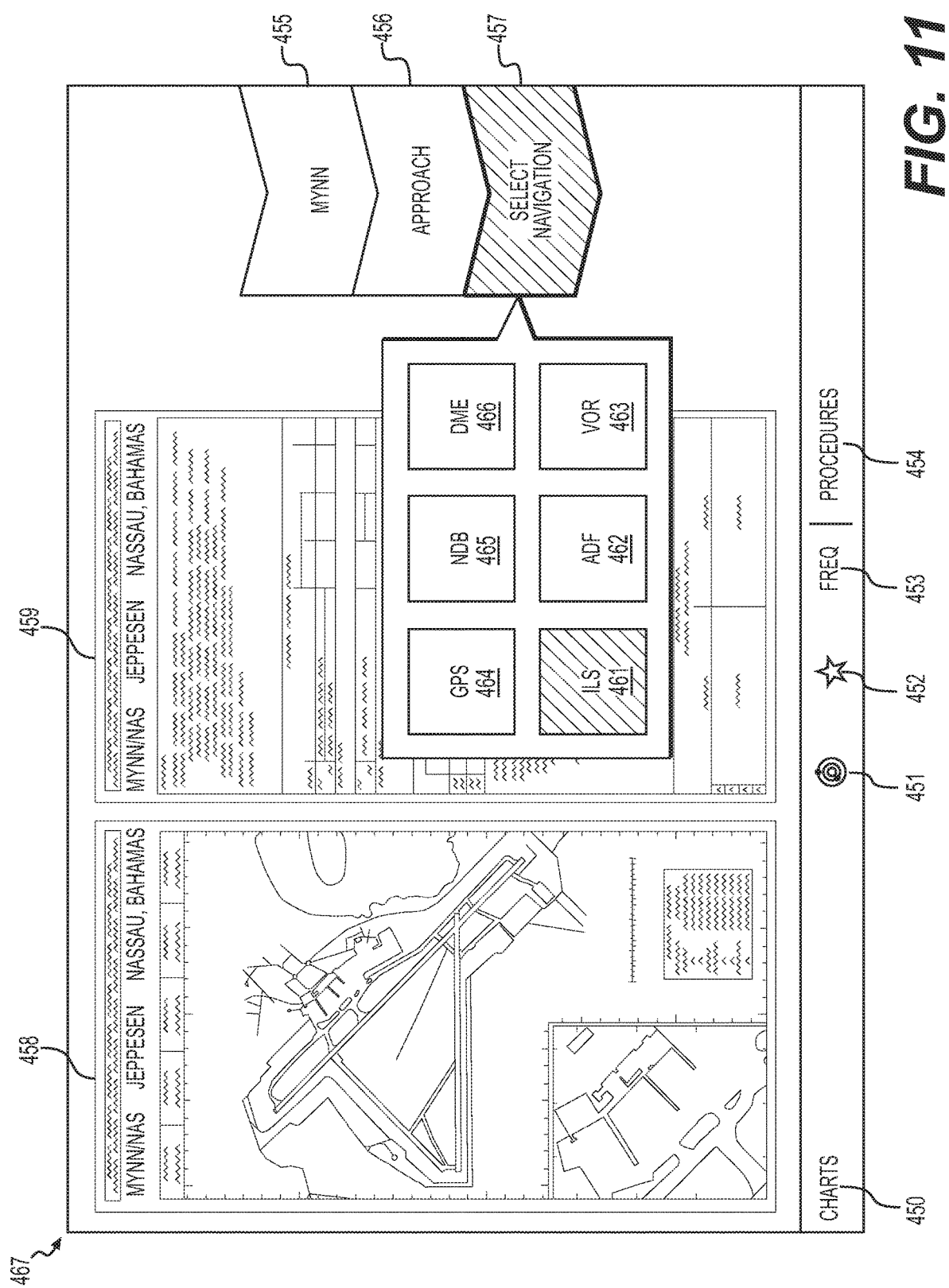
FIG. 11 depicts one embodiment of a charts panel of a flight planning system for navigation of an aircraft in which navigation by ILS is selected.

FIG. 11 depicts an exemplary charts panel 467 in which navigation by ILS 461 has been selected. Once a navigation type is selected, the charts component automatically displays available runways.

Figure 12:
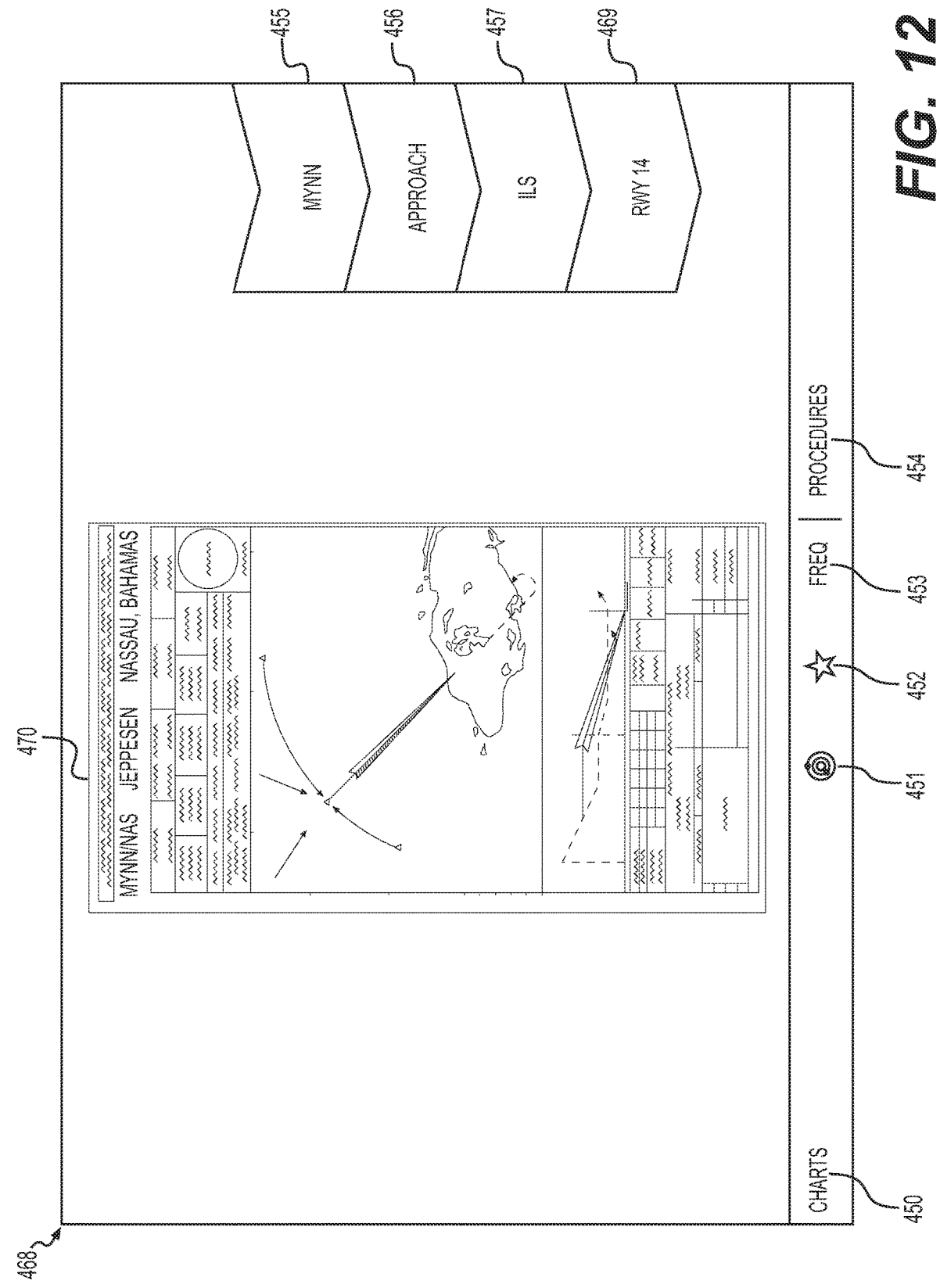
FIG. 12 depicts one embodiment of a charts panel of a flight planning system for navigation of an aircraft in which a runway has been selected.

FIG. 12 depicts an exemplary charts panel 468 in which runway fourteen (RWY 14) 469 has been selected. A chart 470, corresponding to an approach for runway fourteen is displayed in panel 468. Charts panel 468 is configured such that changes to selections may be made by re-selecting any previous selection, for example airport code indicator 455, approach/departure indicator 456, or select navigation indicator 457.

Figure 13:
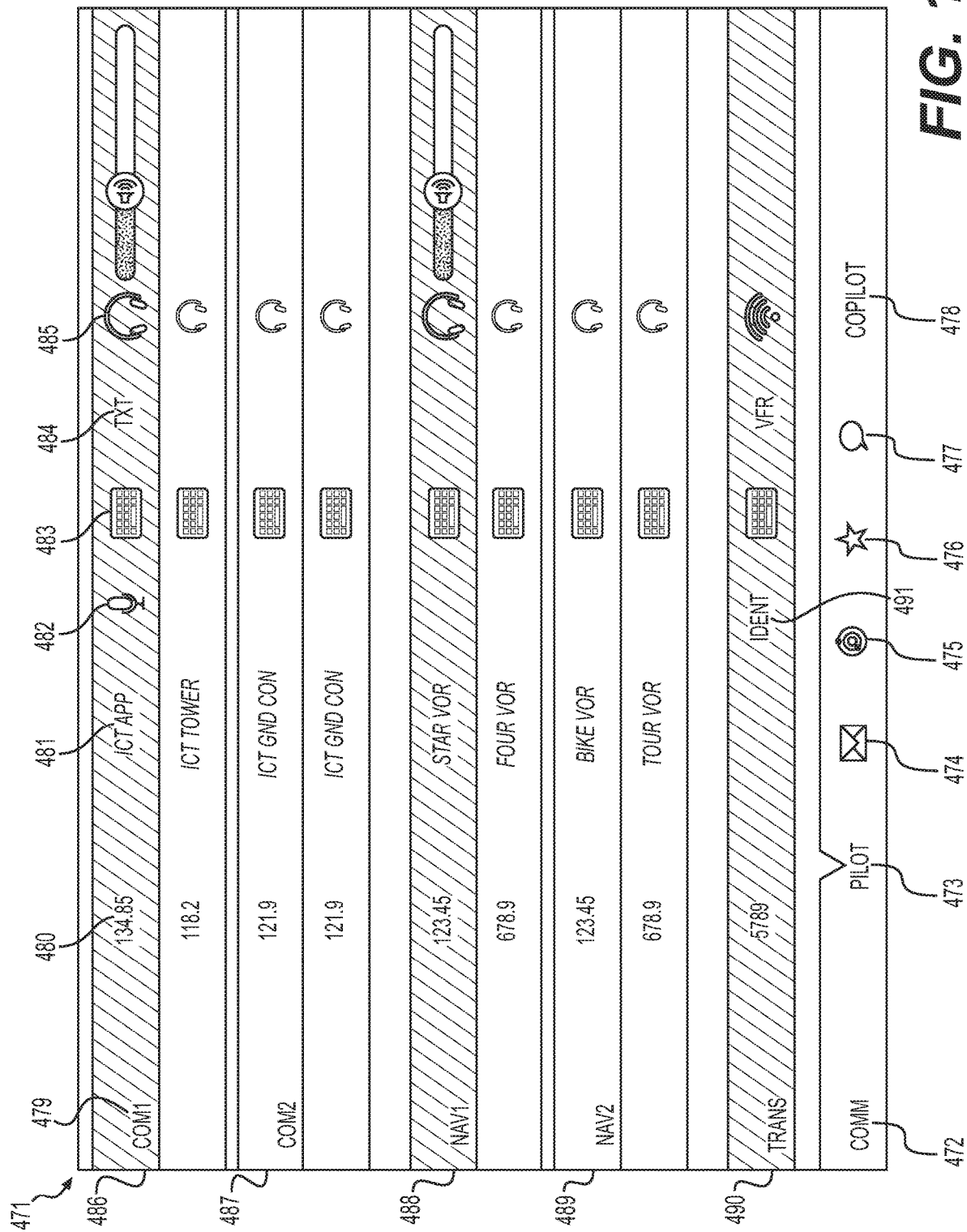
FIG. 13 depicts one embodiment of a radio frequency panel for navigation of an aircraft.

FIG. 13 depicts an exemplary radio frequency panel 471 of the flight planning system. Radio frequency panel 471 may be accessed in several ways, including selecting or touching one of a communications link on TSIP 210, proximity icon 402, or favorites icon 403. Within the mapping interface 429, radio frequency panel is accessed in response to touch of radio source locations displayed on the map, including, for example, waypoints and origin/destination airports. Lastly, radio frequency component may be accessed by typing or searching for an airport code, airport name, or radio frequency, using a keyboard to search a menu stored in database 230.

Radio frequency panel 471 includes a title indicator 472, a pilot indicator 473, an email icon 474, a proximity icon 475, a favorites icon 476, a text message icon 477, and a co-pilot indicator 478. An example title, as in FIG. 13, is COMM, which is communication abbreviated, communication being the primary purpose of radio frequency panel 471. Pilot indicator 473 illuminates when a pilot (as opposed to a co-pilot) is the active user who controls radio frequency panel 471. Email icon 474 is used to access an email client for communicating via email. Proximity icon 475 and favorites icon 476, which are examples of proximity icon 402 and favorites icon 403 of FIG. 3, are used for accessing radio frequencies based on proximity to the aircraft or based on a list of favorite radio frequencies, respectively. Text message icon 477 provides a link to a text messaging component for sending and receiving text messages sent via radio. Co-pilot indicator 478 illuminates when a co-pilot (as opposed to a pilot) is the active user who controls radio frequency panel 471.

Radio frequency panel 471 includes a display of radio frequencies organized in rows for example. Each row includes a communication type indicator 479, a radio frequency indicator 480, a radio frequency identifier 481, a microphone icon 482, a keyboard icon 483, a TXT icon 484, and a headset icon 485. Communication type indicator 479 lists the type of use for each corresponding radio frequency indicator 480. For example, COM indicates a radio frequency used for radio communication (e.g., with an airport tower or ground control), and NAV indicates a radio frequency used for aircraft navigation (e.g., with ground radio beacons). Radio frequency indicator 480 lists the actual frequency of the radio waves in kHz. Radio frequency identifier 481 is a name to describe the purpose or recipient of the radio communication at that particular frequency. In an embodiment, radio frequency identifier 481 includes custom names for rapid identification of appropriate radio frequencies. Microphone icon 482 provides a switch and display for turning a microphone on or off for radio communication. Selection of keyboard icon 483 brings up a keyboard on TSIP 210 for typing. TXT icon 484 displays which radio frequency is active for sending and receiving text messages via the text messaging component. Headset icon 485 includes volume control for adjusting headset volume.

The rows of radio frequencies listed in panel 471 include a first communications channel 486, abbreviated COM1; a second communications channel 487, abbreviated COM2; a first navigation channel 488, abbreviated NAV1; a second navigation channel 489, abbreviated NAV2; and a transmit channel 490, abbreviated TRANS 490. Rows 486, 488, and 490 are highlighted to indicate active radio frequencies. First and second communications channels 486, 487 are, for example, used for radio communication with an airport ground control. First and second navigation channels 488, 489 are, for example, used for radio communication with navigational aids, such as fixed ground beacon or GPS networks. Transponder channel 490 is, for example, used for identification with other aircraft and air traffic control. An identify symbol (IDENT) 491 may be selected to transmit a transponder code to air traffic control or another aircraft. Additional frequencies may be listed, for example, under rows 486, 487, 488, and 489 in FIG. 13, for quick and easy selection of alternate radio frequencies. Additionally, other frequencies not shown can be accessed by scrolling the window down to access them. Those frequency channels include, but are not limited to, automatic direction finder (ADF), direction measuring equipment 1 and 2 (DME1 and DME2), and high frequency 1 and 2 (HF1 and HF2).

Figure 14:
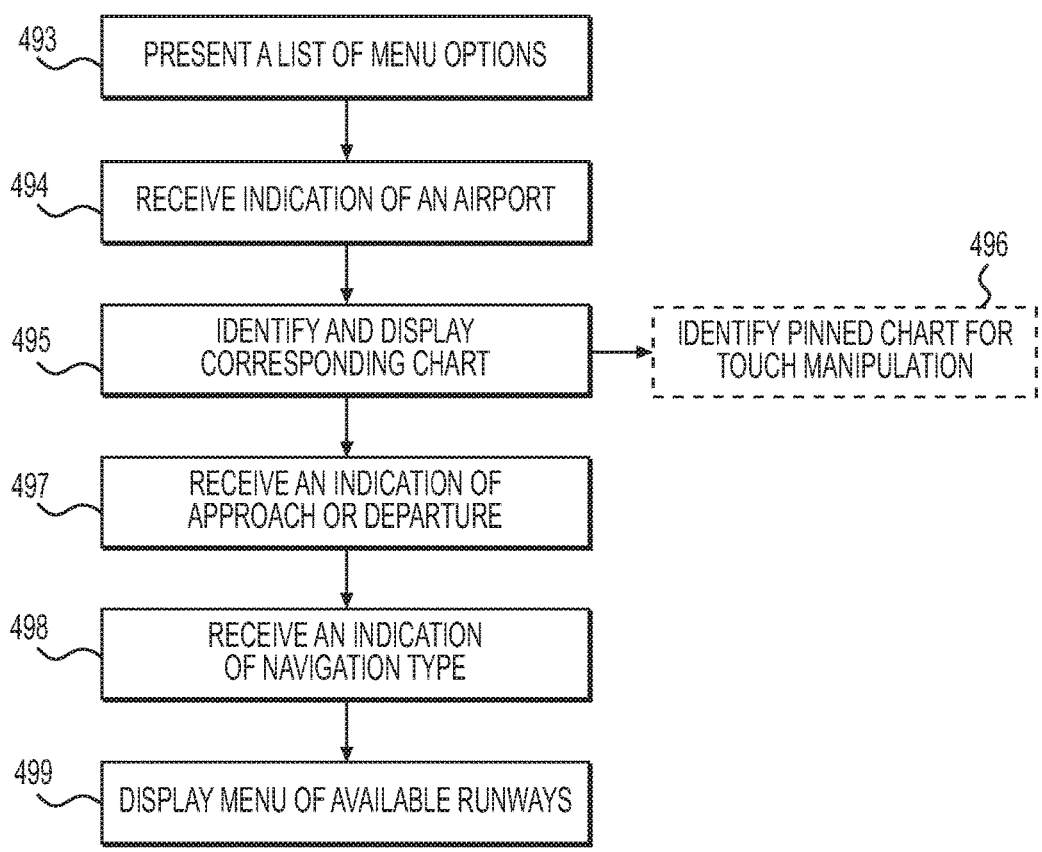
FIG. 14 shows steps of one embodiment of a flight planning method for providing a chart on a touch screen device.

FIG. 14 shows steps of an exemplary flight planning method 492 for providing a chart on a touch screen device. Method 492 utilizes onboard computer 201 to process information including user input, database 230, GPS location, and flight plan, for determining which airport chart to display. Database 230 provides the necessary charts to display for example. GPS location data are accessed, for example, when the proximity component is used to select an airport. Flight plan data may be used based upon origin and destination airports of a loaded flight plan.

In step 493, a list of menu options is presented on a touch screen mounted in an aircraft cockpit. In an example of step 493, a charts function is selected displaying charts panel 449. In an embodiment, charts function is selected from origin chart icon 411, destination chart icon 413, proximity icon 402, or favorites icon 403 of panel 400 of FIG. 3, or from one or more touch icons displayed on TSIP 210. In an embodiment, charts component is activated in response to touch of an origin location 419 or destination location 442 within mapping interface 429. In an embodiment, charts component is activated by typing an airport code, airport name, or city from a keyboard. Menu options are selected by using charts panel 449 (FIG. 9) displayed on TSIP 210.

In step 494, an indication of an airport is received. In an example of step 494, an indication of an airport is selected and its code is displayed using airport code indicator 455 of charts panel 449 of FIG. 9. In an embodiment, an airport for Nassau, Bahamas, is selected and the airport code MYNN is displayed (see FIG. 9).

In step 495, corresponding charts are identified and automatically displayed. In an example of step 495, a first page chart 458 and a second page chart 459 are identified and displayed in charts panel 449.

In optional step 496, it is identified that a selected chart is pinned to the touch screen by selection of a pin icon to enable manipulation of the selected chart with one or more touch gestures. In an example of optional step 496, charts panel 449 is pinned to TSIP 210 enabling first and second chart pages 458, 459 to be dragged, scrolled, rotated, zoomed or otherwise manipulated using touch gestures. A chart may be pinned to TSIP 210 before or after any step of method 492.

In step 497, an indication of approach or departure is received. In an example of step 497, approach is selected and displayed using approach/departure indicator 456 of charts panel 449 of FIG. 9.

In step 498, an indication of a navigation type is received. In an example of step 498, navigation type is selected using select navigation indicator 457 of charts panel 449 of FIG. 9. In an embodiment, available navigation types include ILS 461, ADF 462, VOR 463, GPS 464, NDB 465, and DME 466 as depicted in charts panel 460 of FIG. 10. In an embodiment, navigation by ILS 461 is selected as shown in charts panel 467 of FIG. 11.

In step 499, a menu of available runways is automatically displayed. In an example of step 499, a menu of available runways is displayed in charts panel 449. In an embodiment, runway fourteen (RWY 14) 469 is selected and corresponding chart 470 for approach to runway fourteen is shown in charts panel 468 of FIG. 12.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method for flight planning utilizing an interactive map on a touch screen device in an aircraft cockpit comprising:
    displaying on the touch screen device a real-time external view captured by a camera;
    overlaying the interactive map over the real-time external view on the touch screen device, wherein the touch screen device laterally spans the aircraft cockpit and the interactive map may be moved on the touch screen device such that both a pilot and a copilot are able to interface with the interactive map for flight planning while maintaining a heads-up view via the real-time external view;
    receiving a set of flight rules via touch input on the interactive map from the pilot or copilot;
    receiving an indication of an origin airport and a destination airport via touch input on the interactive map from the pilot or copilot;
    displaying a flight path on the interactive map based on each of the set of flight rules and the origin and destination airports;
    receiving an indication for a desired altitude and a desired airspeed;
    calculating a remaining duration and a remaining distance to arrive at the destination based on the flight path, the desired altitude, and the desired airspeed;
    automatically displaying the remaining duration and the remaining distance via the mapping interface;
    displaying a virtual flight plan on the one or more maps, the virtual flight plan comprising:
        displaying a position of the aircraft on the one or more maps;
        moving the position of the aircraft along the flight path;
        simultaneously updating the remaining duration and the remaining distance in coordination with the position of the aircraft; and
    displaying a dynamic weather representation of forecasted weather that overlays the one or more maps and updating the dynamic weather representation as part of the virtual flight plan, such that the position of the aircraft moving along the flight path is illustrated dynamically encountering the forecasted weather representation.

2. The method of claim 1, wherein receiving the set of flight rules comprises receiving one of high instrument flight rules, low instrument flight rules, or visual flight rules.

3. The method of claim 1, wherein receiving an indication of the origin airport and the destination airport comprises determining the origin airport and the destination airport based on received map locations from the pilot or copilot touching and holding a location within the interactive map.

4. The method of claim 1 further comprising receiving an indication of an origin runway and a destination runway.

5. The method of claim 1, further comprising receiving an indication of one or more waypoints between the origin and destination based on received map locations, wherein a waypoint is a coordinate in physical space and each waypoint is selected by touching and holding a location on the interactive map.

6. The method of claim 1, further comprising displaying forecasted weather utilizing dynamic representations on the interactive map.

7. The method of claim 1, further comprising previewing a simulated flight plan, wherein an aircraft icon simulates the flight path on the interactive map, including potential interaction with the dynamic representation of forecasted weather.

8. A flight planning method for navigating an aircraft via a touch screen device, comprising:
    displaying on the touch screen device a real-time panoramic view external of the aircraft;
    overlaying a mapping interface over the real-time panoramic view on the touch screen device, wherein the touch screen device spans a cockpit of the aircraft and the mapping interface may be moved on the touch screen device such that both a pilot and a copilot are able to make touch selections on the mapping interface for flight planning while maintaining a heads-up view via the real-time panoramic view;
    receiving an indication of an origin and a destination from touch selections within one or more maps displayed via the mapping interface of the touch screen device;
    displaying a flight path on the one or more maps based on the indication of the origin and the destination;
    receiving an indication for a set of flight rules;
    updating the flight path based on the set of flight rules;
    receiving an indication for a desired altitude and a desired airspeed;
    calculating a remaining duration and a remaining distance to arrive at the destination based on the flight path, the desired altitude, and the desired airspeed;
    automatically displaying the remaining duration and the remaining distance via the mapping interface;
    displaying a virtual flight plan on the one or more maps, the virtual flight plan comprising:
        displaying a position of the aircraft on the one or more maps;
        moving the position of the aircraft along the flight path;
        simultaneously updating the remaining duration and the remaining distance in coordination with the position of the aircraft; and
        displaying a dynamic weather representation of forecasted weather that overlays the one or more maps and updating the dynamic weather representation as part of the virtual flight plan, such that the position of the aircraft moving along the flight path is illustrated dynamically encountering the forecasted weather representation.

9. The flight planning method of claim 8, further comprising creating a primary flight plan and an alternate flight plan, wherein one or more of the desired altitude, the desired airspeed, and the flight path differ between the primary flight plan and the alternate flight plan, such that the remaining duration and the remaining distance for each of the primary and alternate flight plans may be simultaneously compared.

10. The flight planning method of claim 9, further comprising receiving an indication to designate the alternate flight plan as a standby flight plan.

11. The flight planning method of claim 8, further comprising displaying a dynamic weather representation of forecasted weather that overlays the one or more maps.

12. A method for providing a flight plan on a touch screen device spanning a width of a cockpit instrument panel of an aircraft, comprising:
- displaying, on the touch screen device, a real-time panoramic view from a forward-facing camera mounted to the aircraft;
- displaying a menu overlaying the real-time panoramic view, the menu including an indicator for a mapping interface, wherein the menu may be moved on the touch screen device such that both a pilot and a copilot are able to make touch selections while maintaining a heads-up view via the real-time panoramic view;
- receiving a selection of the mapping interface and automatically displaying the mapping interface overlaying the real-time panoramic view;
- receiving an indication for a type of map for displaying via the mapping interface;
- receiving an indication for a set of flight rules via the mapping interface;
- receiving an indication for an origin and a destination via the mapping interface;
- displaying a flight path from the origin to the destination on a map of the type indicated based on the set of flight rules;
- receiving an indication for a desired altitude and a desired airspeed;
- calculating a remaining duration and a remaining distance to arrive at the destination based on the flight path, the desired altitude, and the desired airspeed;
- automatically displaying the remaining duration and the remaining distance via the mapping interface;
- displaying a virtual flight plan on the one or more maps, the virtual flight plan comprising:
  - displaying a position of the aircraft on the one or more maps:
  - moving the position of the aircraft along the flight path;
  - simultaneously updating the remaining duration and the remaining distance in coordination with the position of the aircraft; and
  - displaying a dynamic weather representation of forecasted weather that overlays the one or more maps and updating the dynamic weather representation as part of the virtual flight plan, such that the position of the aircraft moving along the flight path is illustrated dynamically encountering the forecasted weather representation.

13. The method for flight planning of claim 12, wherein receiving the indication of the type of map comprises receiving one or more of a satellite imagery map, a terrain representations map, and a flight rules map.

14. The flight planning method of claim 12, further comprising dragging the mapping interface to a desired location of the touch screen device, and pinning the mapping interface to the desired location to enable scrolling, rotating, and zooming of the map via touch gestures.

15. The method of claim 12, further comprising receiving an indication of one or more waypoints between the origin and destination based on map locations received by the pilot or copilot touching and holding a location on the interactive map, and updating the flight path based on the one or more waypoints.

16. The method for flight planning of claim 15, further comprising displaying, via the mapping interface, in real-time during a flight, a position, an altitude and an airspeed of the aircraft, and a remaining duration and a remaining distance to the destination.

* * * * *